(12) United States Patent
Lof et al.

(10) Patent No.: US 10,421,128 B2
(45) Date of Patent: *Sep. 24, 2019

(54) METHOD TO MACHINE A METAL WORK PIECE BY TURNING

(71) Applicant: SANDVIK INTELLECTUAL PROPERTY AB, Sandviken (SE)

(72) Inventors: Ronnie Lof, Sandviken (SE); Adam Johansson, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,111

(22) Filed: Feb. 9, 2018

(65) Prior Publication Data

US 2018/0169765 A1    Jun. 21, 2018

Related U.S. Application Data

(63) Continuation of application No. 15/289,101, filed on Oct. 7, 2016, now Pat. No. 9,925,594.

(30) Foreign Application Priority Data

Oct. 9, 2015   (EP) .................................... 15189176

(51) Int. Cl.
| | |
|---|---|
| *B23B 1/00* | (2006.01) |
| *B23B 3/36* | (2006.01) |
| *B23B 27/16* | (2006.01) |
| *B23B 27/14* | (2006.01) |

(52) U.S. Cl.
CPC .................. *B23B 3/36* (2013.01); *B23B 1/00* (2013.01); *B23B 27/145* (2013.01); *B23B 27/1644* (2013.01); *B23B 2200/049* (2013.01); *B23B 2200/0447* (2013.01); *B23B 2200/081* (2013.01); *B23B 2200/125* (2013.01); *B23B 2200/165* (2013.01); *B23B 2200/201* (2013.01);

(Continued)

(58) Field of Classification Search
CPC ........... B23B 3/30; B23B 3/36; B23B 27/145; B23B 2200/201; B23B 2200/207
See application file for complete search history.

(56) References Cited

U.S. PATENT DOCUMENTS 3,229,349 A * 1/1966 Leksell .................. B23C 5/207
                                                        407/113
3,777,341 A * 12/1973 Faber ................. B23B 27/1614
                                                        407/114

(Continued)

*Primary Examiner* — William Fridie, Jr.
(74) *Attorney, Agent, or Firm* — Corinne R. Gorski

(57) ABSTRACT

A method to form a surface on a metal work piece includes providing a turning insert that has a nose angle formed between first and second cutting edges less than or equal to 85°; providing a turning tool having a tool body with an insert seat in which the turning insert is mountable; arranging the orientation of the second cutting edge such that it forms a back clearance angle of more than 90° in a feed direction; rotating the metal work piece around a rotational axis in a first direction; moving the turning insert in a direction parallel to or at an angle less than 45° relative to the rotational axis; and setting the longitudinal axis of the tool body at an angle greater than zero but less than or equal to 90° relative to the rotational axis of the metal work piece.

38 Claims, 19 Drawing Sheets

(52) U.S. Cl.
CPC ... *B23B 2200/202* (2013.01); *B23B 2200/321* (2013.01); *B23B 2220/24* (2013.01)

(56) References Cited

U.S. PATENT DOCUMENTS

| | | | | |
|---|---|---|---|---|
| 3,934,319 | A | * | 1/1976 | Schuler ................... B23C 5/207 407/113 |
| 4,065,223 | A | * | 12/1977 | Nelson ................ B23B 27/1614 407/114 |
| 5,096,338 | A | * | 3/1992 | Takahashi ............. B23B 27/141 407/114 |
| 6,979,154 | B2 | * | 12/2005 | Mina ....................... B23C 5/109 407/113 |
| 2017/0100778 | A1 | * | 4/2017 | Lof ....................... B23B 27/164 |

* cited by examiner

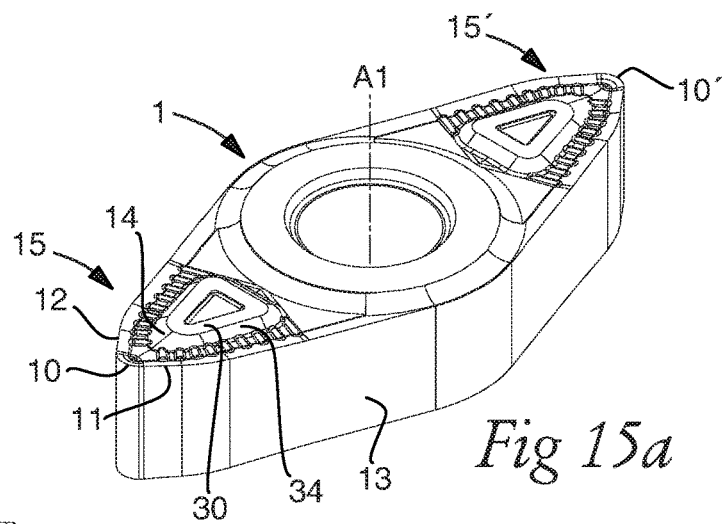
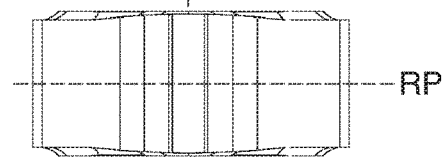
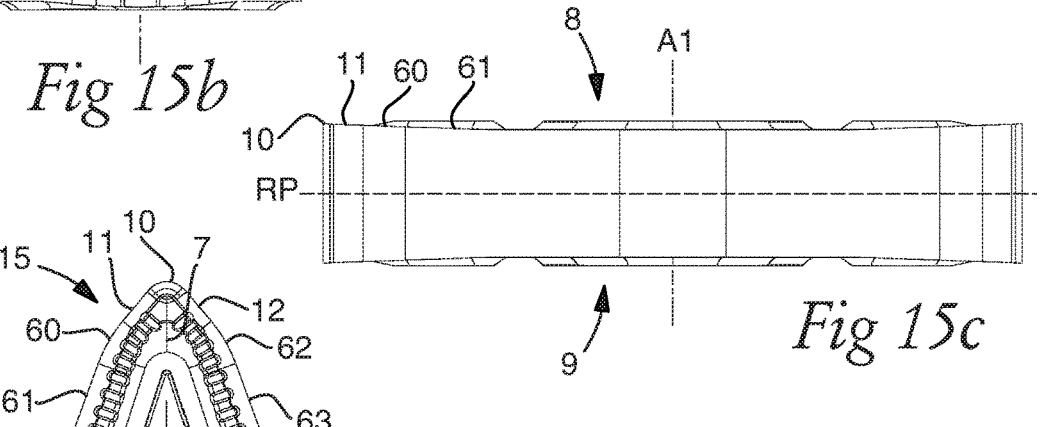
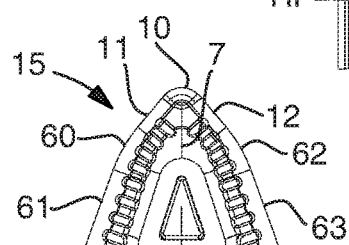
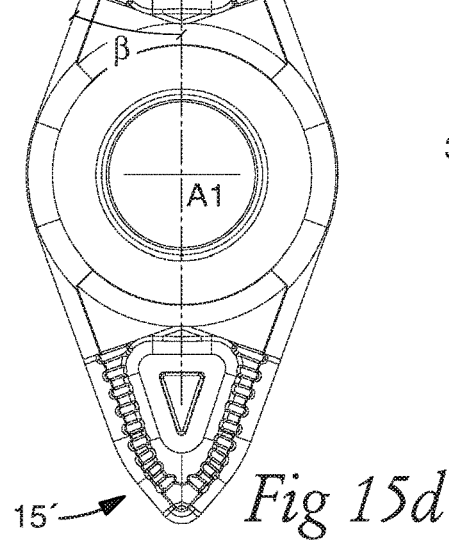
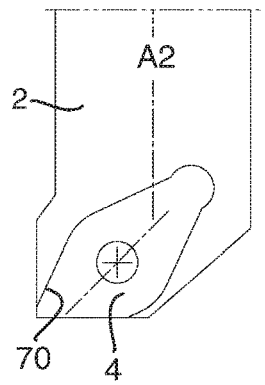

METHOD TO MACHINE A METAL WORK PIECE BY TURNING

RELATED APPLICATION DATA

The present application is a continuation of patent application Ser. No. 15/289,101, filed Oct. 7, 2016, which claims priority under 35 U.S.C. § 119 to EP Patent Application No. 15189176.9, filed on Oct. 9, 2015, which the entirety thereof is incorporated herein by reference.

TECHNICAL FIELD

The present disclosure relates to the technical field of metal cutting. More specifically, the field of turning, which is performed by turning a metal work piece using a turning tool in a machine such as a CNC-machine.

The present disclosure refers to a method to form a surface on a metal work piece, the use of a turning insert in such method, a computer program having instructions which when executed by a computer numerical control lathe causes the computer numerical control lathe to perform such method, a computer readable medium having stored thereon such computer program, and a data stream which is representative of such computer program.

BACKGROUND

In turning of a metal work piece, the metal work piece rotates around a center axis. The metal work piece is clamped at one end by rotatable clamping means such as one or more chuck or jaws. The end of the work piece which is clamped can be called a clamping end or a driving end. For stable clamping, the clamping end or the driving end of the metal work piece may have a larger diameter than the opposite end of the metal work piece and/or has a larger diameter of a portion of the metal work piece located between the clamping end and the opposite end. Alternatively, the metal work piece may have a constant diameter before a machining, i.e. metal cutting, operation.

The turning insert is moved in relation to the metal work piece. This relative movement is called feed. The movement of the turning insert can be in a direction parallel to the center axis of the metal work piece, this is commonly called longitudinal feed or axial feed. The movement of turning insert can furthermore be in a direction perpendicular to the center axis of the metal work piece, this is commonly called radial feed or facing. Other angles of movement, or feed directions, are also possible, this is commonly known as copying or copy-turning.

In copying, the feed has both axial and radial components. During the relative movement of the turning insert, material from the metal work piece is removed in the form of chips. The chips are may be short and/or have a shape or direction of movement which prevents chip jamming and/or do not give a poor surface finish of the machined surface.

Common shapes of turning inserts which can be used for a wide range of feed direction include triangular turning inserts. Such inserts have in a top view, i.e. a rake face towards the viewer, the shape of a triangle where all three sides are of equal length and where the nose angle is 60°. The corners of the triangle are in the form of nose cutting edges, which typically has a radius of curvature in the range of 0.2-2.0 mm. Examples of such turning inserts are commonly designated TNMG and TCMT according to ISO standard, and are commonly made at least partly from coated or uncoated cemented carbide or cubic boron nitride (CBN) or ceramic or cermet.

Other common shapes of turning inserts have in a top view, i.e. a rake face towards the viewer, the shape of a rhombus where all four sides are of equal length and where the nose angle of an active nose portion is 80°. The active corners are in the form of nose cutting edges, which typically has a radius of curvature in the range of 0.2-2.0 mm. Examples of such turning inserts are commonly designated CNMG according to ISO standard, and are commonly made at least partly from coated or uncoated cemented carbide or cubic boron nitride (CBN) or ceramic or cermet.

Both the described triangular and rhombic turning inserts can be used for turning two walls forming an external 90° corner in a metal work piece, where one wall, at a greater distance from the rotational axis of a metal work piece, is perpendicular to the rotational axis and one cylindrical wall, at a smaller distance from the rotational axis, is parallel to the rotational axis, where the two walls are connected by a circular or curved segment. An external 90° corner in this context is a 90° corner formed on or at an external or outer surface of a metal work piece, such that the cylindrical wall or cylindrical surface is facing away from the rotational axis. This is in contrast to any corner which may be formed on or at an internal or inner surface inside a bore concentric with the rotational axis.

The circular or curved segment have a cross-section in a plane including the rotational axis in the shape of an arc, in the shape of a quarter of a circle or a quarter of a shape, which is substantially a circle, which has the same radius of curvature as the nose cutting edge of the turning insert. The circular or curved segment alternatively has a greater radius of curvature than the nose cutting edge of the turning insert.

In EP2572816B1, a turning tool is shown during machining of a work piece. The turning tool can be used for forming two walls forming an external 90° corner, without any reorientation of the turning tool. The tool includes a holder as well as a turning insert. In this case, the work piece is rotated at the same time as the tool is longitudinally fed parallel to the center axis of the. The setting angle, or entering angle, is the angle between the direction of the longitudinal feed and a main edge. The setting angle, or entering angle, is 95°. The turning insert has a rhombic basic shape and comprises two acute-angled corners having an angle of 80° and two obtuse-angled ones having an angle of 100°. A back clearance angle of 5° is obtained between the turning insert and the generated surface of the work piece. The generated surface of the work piece is substantially cylindrical.

Such a turning method as in EP2572816B1 gives an unsatisfactory tool life, or usage time, for the turning insert.

SUMMARY

To overcome the above disadvantages, the present disclosure is directed to a method to form a surface on a metal work piece including a first machining step of providing a turning insert including a first cutting edge, a second cutting edge and a convex nose cutting edge connecting the first and second cutting edges, and selecting a nose angle α formed between the first and second cutting edges to be less than or equal to 85°; providing a turning tool including the turning insert and a tool body, the tool body having a front end and a rear end, a main extension along a longitudinal axis extending from the front end to the rear end, and an insert seat formed in the front end in which the turning insert is mountable; arranging the orientation of the second cutting edge such that it forms a back clearance angle ψ of more than 90° in a feed direction; positioning all parts of the turning insert ahead of the nose cutting edge in the feed direction; rotating the metal work piece around a rotational axis A3 in a first direction; moving the turning insert in a direction parallel to or at an angle less than 45° relative to the rotational axis such that the first cutting edge is active and ahead of the nose cutting edge in the feed direction and such that the surface at least partly is formed by the nose cutting edge; and setting the longitudinal axis of the tool body at an angle greater than zero but less than or equal to 90° relative to the rotational axis of the metal work piece.

According to the present method, the second cutting edge is not subject to wear during the first machining step, e.g. an axial turning step, and can be used in a subsequent second machining step, e.g. an out facing step i.e. fed perpendicular to and away from the rotational axis of the metal, or metallic, work piece, or in a subsequent turning operation in an substantially opposite or opposite direction relative to the first direction.

It is advantageous for the tool life of the turning insert that the wear of the cutting edges is distributed in an equal manner. According to the present method, it is possible to use the turning insert in a prior or subsequent second machining step, e.g. an out facing operation, without reorientation, preferably in such a way that insert wear is distributed over a longer cutting edge distance, with little or no overlap for the insert wear caused by the first machining step and the second machining step.

According to the present method, the chip control or chip evacuation is improved if the feed direction is away from a portion of the work piece which has a larger diameter than the diameter of the surface formed, such as for example a wall surface extending in a plane perpendicular to the rotational axis of the metal work piece.

According to the present method, the entering angle of the first cutting edge is reduced, resulting in relatively wider and thinner chips, which the inventors have found to give reduced wear of the first cutting edge.

The present method is thus related to axial or longitudinal or copy turning, which can be external or internal. The method can be an external turning method, i.e. a method where the surface which is formed is facing away from the rotational axis. The surface which is formed, or generated, is a rotational symmetrical surface, i.e. a surface which has an extension along the rotation axis of the metal work piece and where in a cross sections perpendicular to the rotational axis, each portion of the rotational symmetrical surface is located at a constant distance from the rotation axis of the metal work piece, where a constant distance is a distance which is within 0.10 mm, for example, within 0.05 mm.

The rotational symmetrical surface can be in the form of e.g. a cylindrical surface or a conical surface or a frusto-conical surface or a tapered surface. The moving or feed direction of the turning insert is away from an imaginary plane perpendicular to the rotational axis. In other words, the moving of the turning insert is with a component of the movement in a direction parallel to the rotational axis of the metal work piece, e.g. the turning insert moves in a direction parallel to the rotational axis, or the turning insert moves in a direction at an angle, for example, an angle less than 15°, relative to the rotational axis.

In the first example, the rotational symmetrical surface is a cylindrical surface which is symmetrical around the rotational axis. In the second example, the rotational symmetrical surface is a conical surface, or a frustoconical surface, or a tapered surface, which is symmetrical around the rotational axis. The rational symmetrical surface generated or formed at least partly by the nose cutting edge has a wavy shape with small peaks and valleys, and the wavy shape is influenced at least partly by the curvature of the nose radius and the feed rate. The wave height is less than 0.10 mm, for example, less than 0.05 mm.

To form, or generate, a rotational symmetrical surface in this meaning is by metal cutting, where chips from the metal work piece are removed by at least one cutting edge. The final shape of the rotational symmetrical surface is formed solely or at least to the greatest extent or at least partly by the nose cutting edge. This is because the nose cutting edge is the part of the turning insert which is located at a shorter distance from the rotation axis of the metal work piece than all other parts of the turning insert.

More specifically, during the first machining step, one first point of the nose cutting edge is the part of the turning insert which is located closest to the rotational axis of the metal work piece. One second point, or trailing point, of the nose cutting edge, which is behind the first point in the feed direction, is the part of the turning insert which is located most rearward in the feed direction or in the direction of insert movement. This first point of the nose cutting edge is located on the same side of the bisector as the first cutting edge, where the bisector is a line which is between the first and second cutting edges at equal distance from the first and second cutting edges.

The second point of the nose cutting edge is located on the same side of the bisector as the second cutting edge. The first cutting edge and the second cutting edge are located on opposite sides of the convex nose cutting edge. The first, second and nose cutting edges are formed at borders of a top surface of the turning insert, which top surface comprises a rake face.

The expression "positioning all parts of the turning insert ahead of the nose cutting edge in the feed direction" thus can alternatively be formulated as "positioning all parts of a top surface of the turning insert ahead of a trailing portion of the nose cutting edge in the feed direction."

The nose angel of less than or equal to 85° gives a similar advantage as that of a 90° corner, i.e. two wall surfaces being perpendicular to each other that can be machined with one nose portion of the turning insert, without any reorientation of the turning insert. Alternatively, a nose angle less than or equal to 85° is equal to a nose cutting edge having the shape of a circular arc of an angle of less than or equal to 85°.

The nose cutting edge may have a shape of a circular arc, or may have a shape that deviates slightly from a perfect circular arc. The nose cutting edge can have a radius of curvature of 0.2-2.0 mm.

The first and second cutting edges can be straight in a top view. Alternatively, the first and second cutting edges can be slightly convex or concave, with a radius of curvature that is more than two times greater, for example, more than ten times greater, than the radius of curvature of the convex nose cutting edge.

The moving of the turning insert is commonly known as feed. If the feed is parallel to the rotational axis of the metal work piece, it is called axial feed or longitudinal feed. The first cutting edge is ahead of the nose cutting edge in the feed direction. In other words, the first cutting edge forms, or is active at, an entering angle less than 90° and more than 1°, less than 45° and more than 3°, and less than 45° and more than 10°. In other words, the first cutting edge is a leading edge. The entering angle is the angle between the feed direction and the active cutting edge, which in this case is first cutting edge.

The second cutting edge forms a back clearance angle ψ of more than 90°, for example, more than 100°. In other words, the second cutting edge is a trailing edge. The angle between the feed direction, i.e. the direction of movement of the turning insert, and the second cutting edge is less than 90°, for example, less than 80°. In turning, at least in turning where a first cutting edge and a second cutting edge is located in a plane comprising the rotation axis, the entering angle plus the nose angle (the angle between the first and second cutting edges adjacent on opposite sides of the nose cutting edge) plus the back clearance angle ψ equals 180°.

In FIG. 2 where the feed is parallel to the rotation axis, the back clearance angle is 90° plus κ2. Alternative formulations of the back clearance angle ψ includes end cutting edge angle, free cutting angle, and plan trail clearance angle. The rotating and moving are motions which are relative, which means that although it is preferred that the metal work piece rotates and that the turning insert moves in an axial direction, it is possible in e.g. bar peeling machines that the turning insert rotates around a non-rotating metal work piece, and that the metal work piece moves in an axial direction.

The turning insert can be mounted in a tool body. The tool body is turn mounted in a turning lathe or a CNC-machine.

The feed rate can be less than or equal to the radius of curvature of the nose cutting edge, if the nose cutting edge has a constant radius of curvature. This is to generate an acceptable surface finish. For example, for a turning insert having a nose cutting edge with a radius of curvature of 0.8 mm, the feed rate being less than or equal to 0.8 mm per revolution. For turning inserts having a nose cutting edge which deviates slightly from a circular arc, such as so called wiper radius or wiper insert, the feed rate can be slightly higher while still generating an acceptable surface finish. The formed or generated surface has an extension which corresponds to the feed direction.

According to an embodiment, the first machining step further includes the steps of clamping the metal work piece at a first end, setting the nose cutting edge a shorter distance to the first end than all other parts of the turning insert and moving the turning insert in a direction away from the first end.

According to the present method, chip jamming is further improved, because the moving of the turning insert, i.e. the feed direction, is towards an un-clamped or free end of the metal work piece.

The first end of the metal work piece is a clamping end or driving end. Thus, the clamping means, e.g. chuck or clamping jaws or tail stock, which holds the metal work piece, are controlled and driven by a motor hold the metal work piece in the first end. The headstock end of the machine is located at the first end of the metal work piece. The diameter of the first end of the metal work piece can be greater than the diameter of the surface.

According to an embodiment, the first machining step further includes the step of arranging the first cutting edge such that the first cutting edge cuts metal chips from the metal work piece at an entering angle κ1 of 10-45°.

The first cutting edge is thus active at an entering angle κ1 of 10-45°, for example, 20-40°. A lower entering angle gives too wide chips resulting in reduced chip control, and the risk of vibration would increase. A higher entering angle gives increased insert wear of the first cutting edge. Accordingly, the nose angle, i.e. the angle which the first and second cutting edges form relative to each other in a top view, is 25-50°. A top view is where a top surface, i.e. a rake face, of the turning insert is facing the viewer and is perpendicular to the view direction. The cutting depth can be 0.05-5.0 mm.

According to an embodiment, the first machining step further includes the step of providing that the turning insert comprises a third convex cutting edge adjacent to the first cutting edge and a fourth cutting edge adjacent to the third cutting edge, the method further including the step of arranging the forth cutting edge such that the fourth cutting edge cuts metal chips from the metal work piece at an entering angle κ1 of 10-45°.

According to the present method, the tool life of the turning insert is further increased, i.e. the wear is further reduced, especially at relatively larger depths of cut, such as e.g. depth of cut greater than 1.0 mm.

The nose angel α, i.e. the angle between the first and second cutting edges, can be 70-85°. Thus, the wear of the nose cutting edge is further reduced.

According to an embodiment, the first machining step further includes the step of entering the turning insert into the metal work piece at an angle relative to the rotation axis A3 which is less than 90°, and which angle is greater than the angle formed between the feed direction of the turning insert and the rotational axis A3. Accordingly, the wear, especially the wear at the nose cutting edge, of the turning insert 1 is further reduced. The turning insert is thus entering the metal work piece, i.e. going into the cut, gradually.

According to an embodiment, the first machining step further includes the step of entering the turning insert into the metal work piece such that the nose cutting edge moves along an arc of a circle. Thus, the wear, especially the wear at the nose cutting edge, of the turning insert is further reduced. When the turning insert enters the metal work piece, i.e goes into the cut, the nose cutting edge moves along an arc of a circle.

According to an embodiment, the first machining step further includes the step of entering the turning insert into the metal work piece such that the chip thickness during entry is constant or substantially constant. Accordingly, the insert wear is further reduced.

Chip thickness is defined as feed rate multiplied by sinus for the entering angle. Thus, by choosing and/or varying the feed rate and the movement and/or direction of the turning insert during entry, the chip thickness can be constant or substantially constant. The feed rate during entry can be less or equal than 0.50 mm/revolution. The chip thickness during entry can be less than or equal to the chip thickness during subsequent cutting or machining.

According to an embodiment, the surface is an external cylindrical surface, and in the moving of the turning insert is in a direction parallel to the rotational axis A3.

An external cylindrical surface is a surface having an extension along and at a constant or substantially constant distance from the rotational axis. The moving of the turning insert is the feed direction.

According to an embodiment, the turning insert has a top surface and an opposite bottom surface. A reference plane RP is located parallel to and between the top surface and the bottom surface. The present method further includes the step of arranging the first cutting edge such that the distance from the first cutting edge to the reference plane RP decreases as the distance from the nose cutting edge. In other words, this distance is decreasing as the distance from the nose cutting edge increases.

According to the present method, the chip breaking and/or chip control and/or tool life, i.e. insert wear, is improved, in axial turning away from the clamping end of the metal work piece.

The top surface can be a rake face. The bottom surface acts as a seating surface. The reference plane is parallel to a plane in which the nose cutting edges are located. The distance from different points of the first cutting edge to the reference plane varies in such a way that that this distance is decreasing at an increasing distance from the nose cutting edge. In other words, the distance from the first cutting edge to the reference plane is decreasing away from the nose cutting edge.

Alternatively formulated, a distance from the reference plane to a first portion of the first cutting edge is greater than a distance from the reference plane to a second portion of the first cutting edge, where the first portion of the first cutting edge is located between the nose cutting edge and the second portion of the first cutting edge. For example, a first point of the first cutting edge, adjacent to the nose cutting edge, is located a greater distance from the reference plane than a distance from a second point of the first cutting edge, located at a greater distance from the nose cutting edge than the first point of the first cutting edge, to the reference plane. The first cutting edge is sloping towards the bottom surface and the reference plane away from the nose cutting edge in a side view.

According to an embodiment the turning insert includes a top surface, an opposite bottom surface, and a reference plane RP is located parallel to and between the top surface and the bottom surface. The method further includes the step of arranging the fourth cutting edge such that the distance from the fourth cutting edge to the reference plane RP decreases at increasing distance from the nose cutting edge. By such a method the chip breaking and/or chip control and/or tool life, i.e. insert wear, is improved, in axial turning away from the clamping end of the metal work piece.

The top surface provides a rake face. The bottom surface provides a seating surface. The reference plane is parallel to a plane in which the nose cutting edges are located. The distance from the fourth cutting edge to the reference plane varies in such a way that that this distance is decreasing at increasing distance from the nose cutting edge. In other words, the distance from the fourth cutting edge to the reference plane is decreasing away from the nose cutting edge. Alternatively formulated, a distance from the reference plane to a first portion of the fourth cutting edge is greater than a distance from the reference plane to a second portion of the fourth cutting edge, where the first portion of the fourth cutting edge is located between the nose cutting edge and the second portion of the fourth cutting edge. For example, a first point of the fourth cutting edge, closer to the nose cutting edge, is located a greater distance from the reference plane than a distance from a second point of the fourth cutting edge, located at a greater distance from the nose cutting edge than the first point of the fourth cutting edge, to the reference plane. The fourth cutting edge slopes towards the bottom surface and the reference plane away from the nose cutting edge in a side view.

According to an embodiment, the method further includes the step of setting the back clearance angle constant in relation to the feed direction during the formation of the surface. In other words, in the case of a constant feed direction when forming the surface, the back clearance angle is constant when forming the surface. Thus, during the formation of the surface the turning insert do not rotate around any axis.

According to an embodiment, the method further includes the step of providing a turning tool having the turning insert and a tool body, wherein the method includes the further step of positioning all parts of the tool body ahead of the nose cutting edge in the feed direction. In other words, the turning tool is ahead of the nose cutting edge in the feed direction. By such a method, the possibility of out facing, or feeding in a direction perpendicular to and away from the rotational axis of the metal work piece, is further improved.

According to an embodiment, the method further includes the step of providing a turning tool including the turning insert and a tool body, the tool body having a front end and a rear end, a main extension along a longitudinal axis extending from the front end to the rear end, an insert seat formed in the front end in which the turning insert is mountable. The method further includes the step of setting the longitudinal axis of the tool body at an angle greater than zero but less than or equal to 90° relative to the rotational axis of the metal work piece.

According to the present method, the risk of vibrations is reduced, compared to if the longitudinal axis of the tool body were parallel to the rotational axis of the metal work piece, at least in the case where the feed direction is parallel to the rotational axis of the metal work piece. According to the present method, the possibility to machine deep cavities or deep pockets are improved, because the risk of the tool body interfering the metal work piece is reduced. The setting of the longitudinal axis of the tool body is perpendicular, i.e. 90°, to the rotational axis of the metal work piece. The longitudinal axis of the tool body can be at a constant angle relative to the longitudinal axis of the tool body.

According to an embodiment, the method includes a second machining step of moving the turning insert in a direction away from the rotation axis A3 such that the second cutting edge cuts chips from the metal work piece, and such that a surface perpendicular to the rotational axis A3 of the metal work piece is formed.

According to the present method, two surfaces, which together form a corner, such as a 90° corner, can be formed with the same turning insert without reorientation of the turning insert, with reduced wear of the turning insert. More specifically, the insert wear is distributed in a more even manner, giving prolonged tool life.

The direction of the movement of the turning insert is away from the rotational axis of the metal work piece, i.e., in a direction perpendicular to the rotational axis, or at an angle which deviates up to 20° from a perpendicular direction to the rotational axis. The direction of rotation of the metal work piece around the rotational axis is the same direction for the first and second machining steps. The second machining step can be made either prior to or after the first machining step. The orientation of the turning insert can be constant during the first and second machining steps. Constant orientation means that the angles which parts of the turning insert, such as the first cutting edge, forms in relation to or relative to the rotational axis of the metal work piece is constant or has the same value at both the first and second machining steps.

According to an embodiment, the method includes the step of in a sequence alternating the first and second machining steps, such that a corner having two surfaces is formed. According to the present method, the insert wear is further reduced. By such a method, the risk for chip jamming is further reduced, because the cutting time for each cut is reduced.

According to an embodiment, the method includes the step of in a sequence alternating the first and second machining steps, such that an external 90° corner having two wall surfaces is formed, wherein one wall surface is an outer cylindrical surface and in that one wall surface is perpendicular to the rotational axis A3 of the metal work piece.

According to the present method, an external 90° corner can be formed with less risk of chip jamming, because the feed direction or the movement of the turning insert is not towards the wall surface which is perpendicular to the rotational axis of the metal work piece. According to the present, an external 90° corner can be formed with reduced insert wear.

The direction of movement of the turning insert during the first machining step is parallel to the rotational axis of the metal work piece. The direction of movement of the turning insert during the second machining step is perpendicular to and away from the rotational axis of the metal work piece. The direction of movement in this sense is during the major part of each machining step.

The entry or start or going into the cut part of each machining step is at least partly in a different direction than the major part. The entry or start or going into the cut part is thus a minor part of each machining step, in the sense that the volume of removed metal is less than 20% than the metal removed from the major part. The surface formed which is perpendicular to the rotational axis is a flat or substantially flat surface, i.e. the surface is located in a single plane. Substantially flat in this sense is a wavy surface, where the wave depth or wave height is less than 0.1 mm, for example, less than 0.05 mm.

The external 90° corner includes two wall surfaces, which are connected by a curved or arc-shaped surface. The radius of curvature of the curved or arc-shaped surface is equal to or greater than the radius of curvature of the nose cutting edge of the turning insert. The curved or arc-shaped surface has a surface area which can be less than 50%, for example, less than 10%, of the surface area of each of the wall surfaces.

According to an embodiment, the method includes a third machining step, including the steps of rotating the metal work piece around the rotation axis A3 in a second direction, in that the second direction of rotation is opposite to the first direction of rotation, and moving the turning insert in a direction towards the rotation axis A3 such that the second cutting edge cuts chips from the metal work piece.

Thus, during the third machining step, at least the second cutting edge of the turning insert is located on an opposite side or a substantially opposite side of the rotational axis, compared to the location of at least the first cutting edge of the turning insert during the first machining step. The third machining step can be performed prior to or after the first machining step. The third machining step can be performed prior to or after the second machining step. The third machining step can include a moving of the turning insert perpendicular to the rotational axis of the metal work piece.

According to an embodiment, the method includes the step of providing a turning tool comprising the turning insert and a tool body, the tool body having a front end and a rear end, a main extension along a longitudinal axis A2 extending from the front end to the rear end, an insert seat formed in the front end in which the turning insert is mountable such that a bisector extending equidistantly from the first and second cutting edges forms an angle θ of 35-55° in relation to the longitudinal axis A2 of the tool body.

According to an embodiment, the method includes the step of arranging the first cutting edge a shorter distance from the longitudinal axis A2 of the tool body than the distance from the second cutting edge to the longitudinal axis A2 of the tool body.

According to another aspect of the present disclosure, at least the above mentioned primary objective is achieved by means of the use of a turning insert in the method as initially defined.

According to a third aspect of the present disclosure, at least the above mentioned primary objective is achieved by means of a computer program having instructions, which when executed by a computer numerical control lathe, cause the computer numerical control lathe to perform the method as initially defined.

The method and methods described herein may be embodied by a computer program or a plurality of computer programs, which may exist in a variety of forms both active and inactive in a single computer system or across multiple computer systems. For example, they may exist as software program(s) of program instructions in source code, executable code or other formats for performing some of the steps. Any of the above may be embodied on a computer readable medium, which include storage devices and signals, in compressed or uncompressed form. The term computer numerical control (CNC) lathe refers to any machine which can be used for turning a metal work piece, and where the motion of the machine, such as tool path, depth of cut, feed rate, cutting speed and revolutions per time unit, is or can be controlled by a computer.

According to a fourth aspect of the present disclosure, at least the above mentioned primary objective is achieved by means of a computer readable medium having stored thereon a computer program having instructions which when executed by a computer numerical control lathe cause the computer numerical control lathe to perform the method as initially defined.

As used herein, a computer readable medium or storage medium can be any means that contain, store, communicate, propagate or transport the program for use by or in connection with the instruction execution system, apparatus, or device. The computer readable medium can be, for example but not limited to, an electronic, magnetic, optic, electromagnetic, infrared, or semiconductor system, device, or propagation medium. More examples (a non-exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

According to a fifth aspect of the present disclosure, at least the above mentioned primary objective is achieved by means of a data stream which is representative of a computer program having instructions which when executed by a computer numerical control lathe cause the computer numerical control lathe to perform the method as initially defined.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 14b is a front view of the turning insert in FIG. 14a.

FIG. 14c is a side of the turning insert in FIG. 14a.

FIG. 14d is a top view of the turning insert in FIG. 14a.

FIG. 15a is a perspective view showing a third turning insert.

FIG. 15b is a front view of the turning insert in FIG. 15a.

FIG. 15c is a side of the turning insert in FIG. 15a.

FIG. 15d is a top view of the turning insert in FIG. 15a.

FIG. 15e is a top view of the turning insert in FIG. 15a and a tool body.

FIG. 15f is a top view of the tool body in FIG. 15e.

FIG. 16b is a front view of the turning insert in FIG. 16a.

FIG. 16c is a side view of the turning insert in FIG. 16a.

FIG. 16d is a top view of the turning insert in FIG. 16a.

FIG. 18b is a top view of the turning insert in FIG. 18a.

FIG. 18c is a bottom view of the turning insert in FIG. 18a.

FIG. 18d is a side view of the turning insert in FIG. 18a.

FIG. 18e is a front top view of the turning insert in FIG. 18a.

FIG. 19b is a top view of the turning insert in FIG. 19a.

FIG. 19c is a bottom view of the turning insert in FIG. 19a.

FIG. 19d is a side view of the turning insert in FIG. 19a.

FIG. 19e is a front top view of the turning insert in FIG. 19a.

FIG. 20b is a top view of the turning insert in FIG. 20a.

FIG. 20c is a bottom view of the turning insert in FIG. 20a.

FIG. 20d is a side view of the turning insert in FIG. 20a.

FIG. 20e is a front top view of the turning insert in FIG. 20a.

FIG. 21b is a top view of the turning insert in FIG. 21a.

FIG. 21c is a bottom view of the turning insert in FIG. 21a.

FIG. 21d is a side view of the turning insert in FIG. 21a.

FIG. 21e is a front top view of the turning insert in FIG. 21a.

FIG. 22b is a top view of the turning insert in FIG. 22a.

FIG. 22c is a bottom view of the turning insert in FIG. 22a.

FIG. 22d is a side view of the turning insert in FIG. 22a.

FIG. 22e is a front top view of the turning insert in FIG. 22a.

Figure 1:
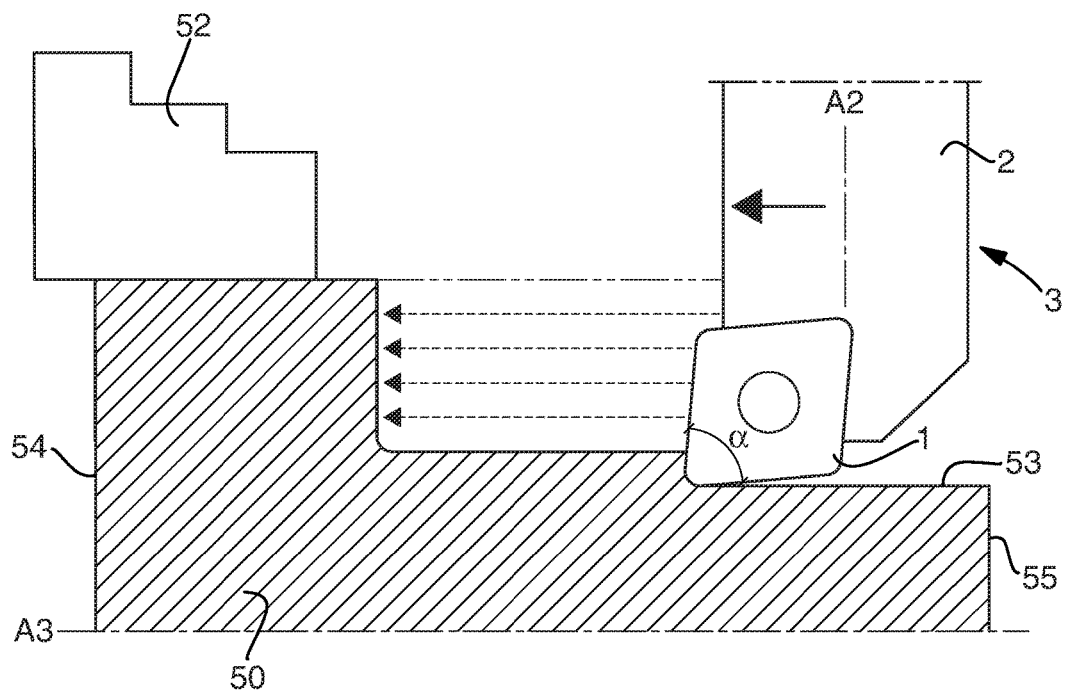
FIG. 1 is a schematic view showing conventional turning of a cylindrical surface with a conventional turning insert.
Figure 10:
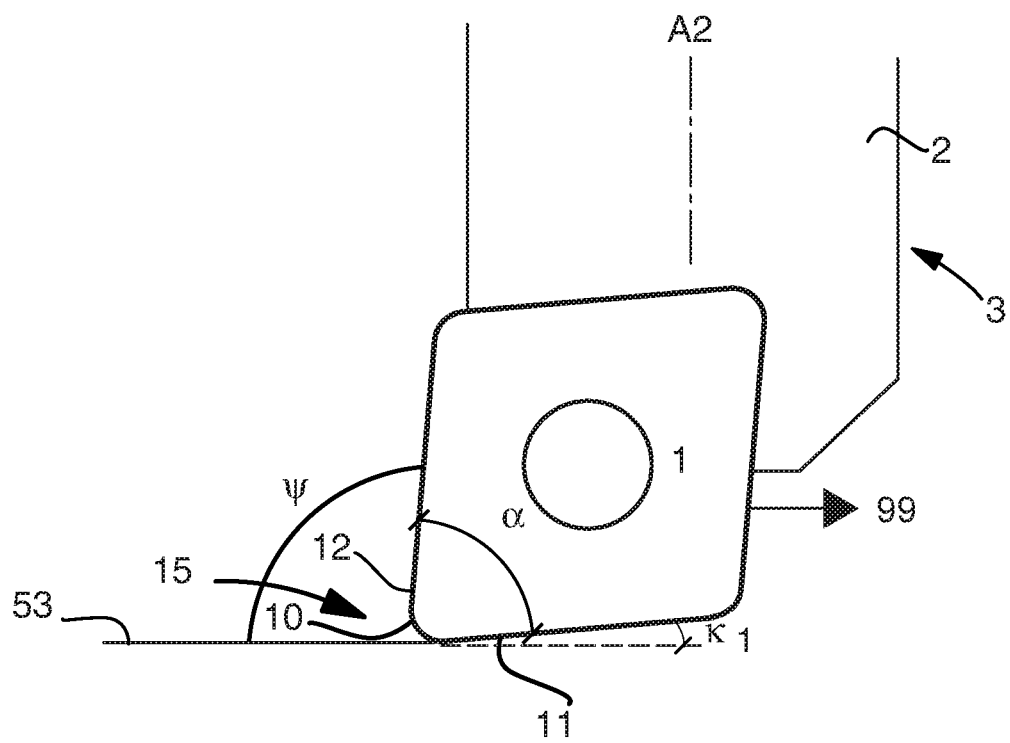
FIG. 10 is a schematic view showing a turning method according to an embodiment forming a surface using a conventional turning insert.

All turning insert figures except FIGS. 1 and 10 have been drawn to scale.

DETAILED DESCRIPTION

Reference is made to FIG. 1, which show a conventional metal cutting operation by turning using a conventional turning insert 1. A metal work piece 50 is clamped by clamping jaws 52, which are connected to a machine comprising a motor (not shown), such as a CNC-machine or a turning lathe. The clamping jaws press against an external surface at a first end 54, or clamping end, of the metal work piece 50.

An opposite second end 55 of the metal work piece 50 is a free end. The metal work piece 50 rotates around a rotational axis A3. The turning insert 1 is securely and removably clamped in an insert seat or a pocket in a tool body 2. The tool body 2 has a longitudinal axis A2, extending from a rear end to a front end, in which the insert seat or pocket is located. The tool body 2 and the turning insert 1 together form a turning tool 3.

The turning tool 3 is moved in relation to the metal work piece 50, commonly designated feed. In FIG. 1, the feed is axial, also called longitudinal feed, i.e. the direction of the feed is parallel to the rotational axis A3. In this way, a cylindrical surface 53 is formed.

The turning insert 1 has an active nose with a nose angle α which is 80°, defined as the angle between the main cutting edge and the secondary cutting edge. As the turning insert 1 reaches closer to the wall surface which is perpendicular to the rotational axis A3, chip control is poor because there is not much space for the chips to get out from the cutting zone. There is also risk that chips hits or damages the machined surface.

The main cutting edge is behind the nose cutting edge. In other words, the entering angle for the main cutting edge is over 90°, in FIG. 1 around 95°. The entering angle is defined as the angle between the cutting edge and the feed direction. In the turning method shown in FIG. 1, the back clearance angle is around 5°. The back clearance angle ψ is defined as the angle between the secondary cutting edge, which is a trailing edge, and a direction which is opposite, i.e. 180° in relation, to the feed direction.

Figure 2:
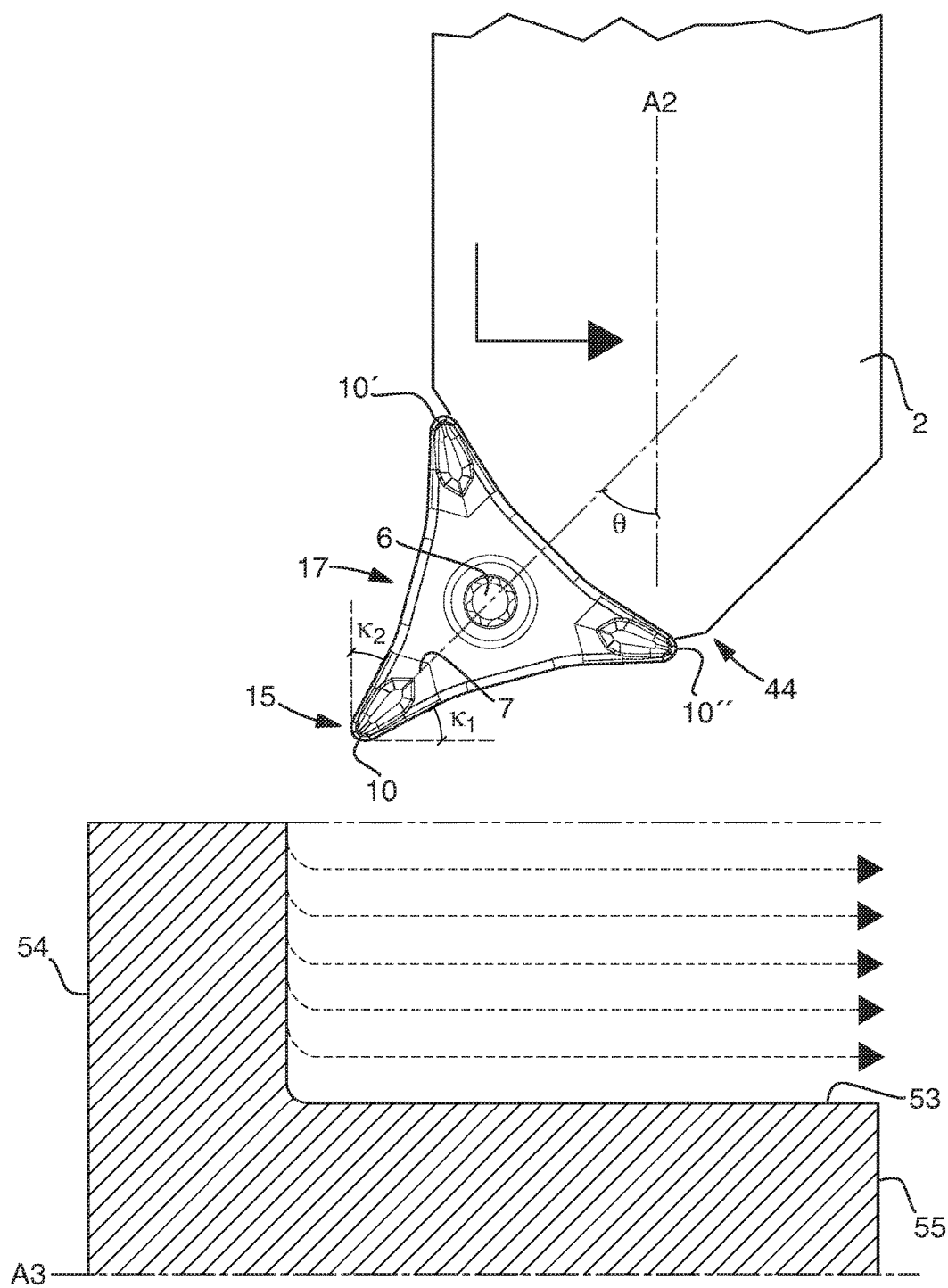
FIG. 2 is a schematic view illustrating turning of a cylindrical surface by a first turning insert.

Reference is made to FIG. 2, which show a turning operation, using a turning tool including a first turning insert. As in FIG. 1, a metal work piece is clamped by clamping jaws (not shown), which are pressed against an external surface at or adjacent to a first end 54 of the metal work piece. An opposite second end 55 of the metal work piece is a free end. The metal work piece rotates around a rotational axis A3. The turning insert, seen in top view, is securely and removably clamped in an insert seat or a pocket in tool body 2 by means of a screw 6. The tool body 2 has a longitudinal axis A2, extending between a rear end and a front end 44, in which the insert seat or pocket is located.

In FIG. 2, the feed is, to a greatest extent, axial, also called longitudinal feed, i.e. the direction of the feed is parallel to the rotational axis A3. In this way, an external cylindrical surface 53 is formed. At the entry of each cut, or immediately prior to the axial feed, the feed has a radial component, in such a way that the turning insert move along an arc of a circle.

The turning insert includes an active nose portion 15, including an active nose cutting edge 10. The active nose portion 15 further includes an active first cutting edge, which during axial turning parallel to the rotational axis A3 has an entering angle κ1 which is chosen to be in the range of 10-45°, for example, 20-40°.

The first cutting edge, which is the main cutting edge in the operation, is ahead of the nose cutting edge 10 in the axial feed direction. In other words, the first cutting edge is a leading edge. A second cutting edge, formed on or at the active nose portion 15, is a secondary cutting edge or a trailing edge. If the feed direction would be radial, in such a way that the feed direction would be perpendicular to and away from the rotational axis A3, the second cutting edge would be active at an entering angle κ2.

A bisector 7 is defined by the first and second cutting edges. In other words, the bisector is formed between the first and second cutting edges. The first and second cutting edges converge at a point outside the turning insert. The bisector of the active nose portion 15 forms an angle θ of 40-50°, relative to the longitudinal axis A2.

The turning insert includes two inactive nose portions, comprising two inactive nose cutting edges 10', 10". In the axial turning operation, all parts of the turning insert are ahead of the active nose cutting edge 10 in the feed direction. In the axial turning operation, chips can be directed away from the metal work piece in a trouble-free manner.

In the machining step the turning insert 1 enters into the metal work piece 50 such that the nose cutting edge 10 moves along an arc of a circle. The turning insert 1 enters into the metal work piece 50, or goes into cut, such that the chip thickness during entry is constant or substantially constant. At the entry, the depth of cut is increased from zero depth of cut. Such preferred entry reduces the insert wear, especially the wear at the nose cutting edge 10. Chip thickness is defined as feed rate multiplied by entering angle.

Thus, by choosing and/or varying the feed rate and the movement and/or direction of the turning insert during entry, the chip thickness can be constant or substantially constant. The feed rate during entry can be less than or equal than 0.50 mm/revolution. The chip thickness during entry can be less than or equal to the chip thickness during subsequent cutting or machining.

The cylindrical surface 53, or rational symmetrical surface, generated or formed at least partly by the nose cutting edge in FIGS. 1 and 2, has a wavy shape with small peaks and valleys, and the wavy shape is influenced at least partly by the curvature of the nose radius and the feed rate. The wave height is less than 0.10 mm, for example, less than 0.05 mm. A thread profile is not a cylindrical surface 53 in this sense.

Figure 3:
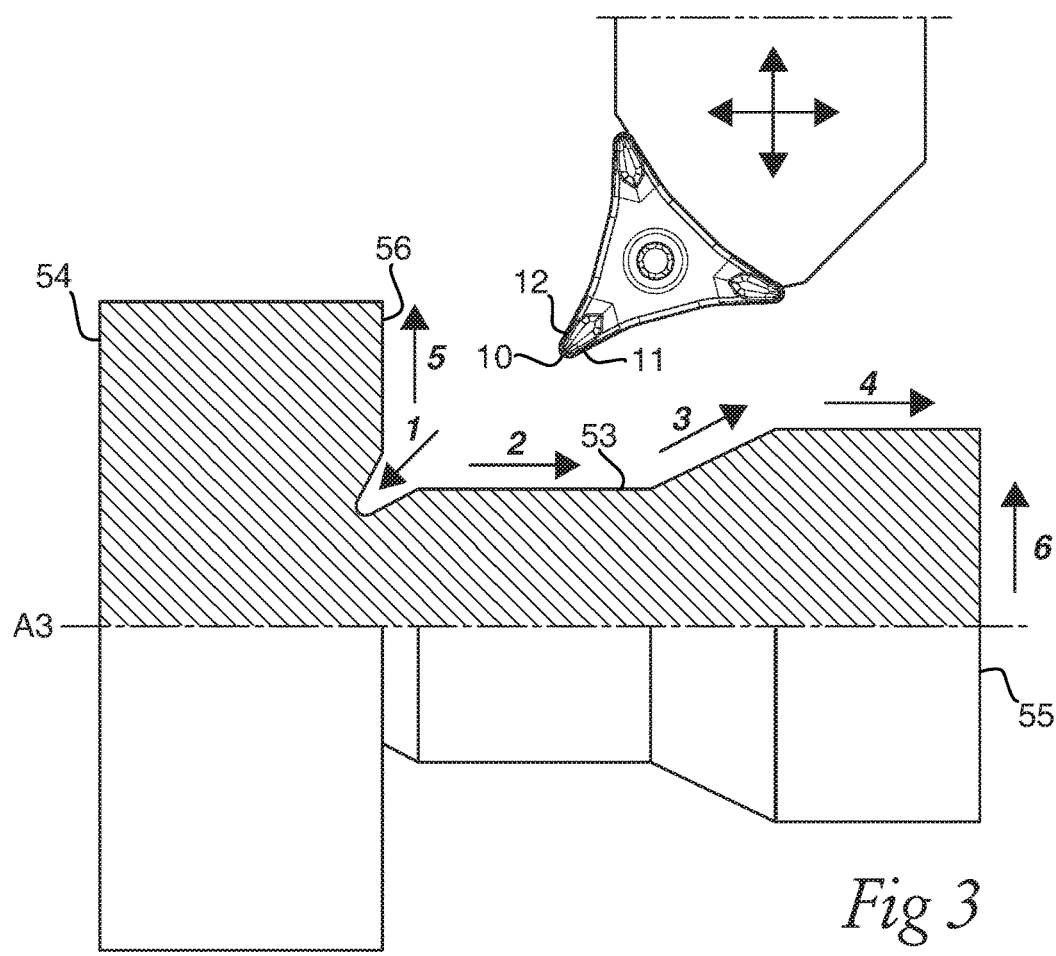
FIG. 3 is a schematic view illustrating turning, including axial turning and out-facing, of a metal work piece with the first turning insert.
Figure 4:
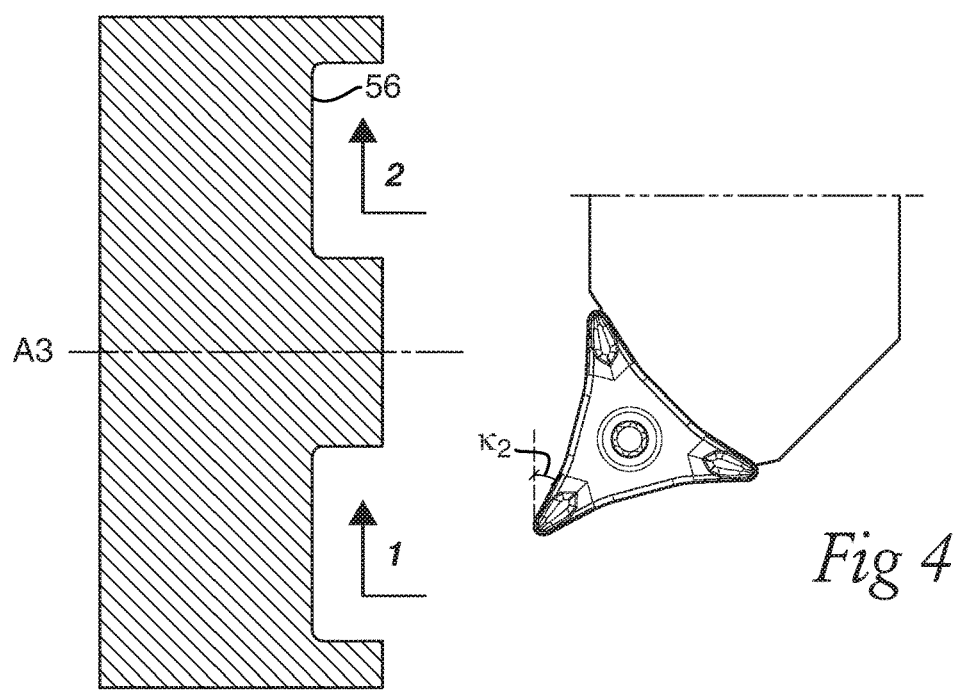
FIG. 4 is a schematic view illustrating turning, including out-facing, of a metal work piece with the first turning insert.

In FIGS. 3 and 4, the turning insert and tool body in FIG. 2 can be seen in alternative machining operations, showing the versatile application area of the turning tool, especially with regard to feed direction. FIG. 3 shows a machining sequence in six steps. Step 1 is a undercutting operation. Step 2 is axial turning away from the first end 54 or clamping end of the metal work piece. Step 3 is a profiling operation in the form of a feed which has both an axial and a radial component, generating a conical or frustoconical, i.e. tapered, surface. Step 4 is an operation similar to operation 2. Step 5 is an out-facing operation generation a flat surface located in a plane perpendicular to the rotational axis A3 of the metal work piece. Step 6 is an out-facing operation at the second end 55 or free end of the metal work piece.

FIG. 4 shows two machining steps, step 1 and step 2. In step 1, the radial feed is perpendicular to and towards the rotational axis A3. In 2, the radial feed is perpendicular to and away from the rotational axis A3, wherein a flat surface 56 perpendicular to the rotational axis A3 is generated. In both cases, the second cutting edge is active at an entering angle κ2 which is in the range of 10-45°, for example, 20-40°. The direction of rotational of the metal work piece around the rotational axis A3 is in opposite directions for step 1 and 2. In step 2, the direction of rotation is the same as in FIG. 1-3.

Figure 5:
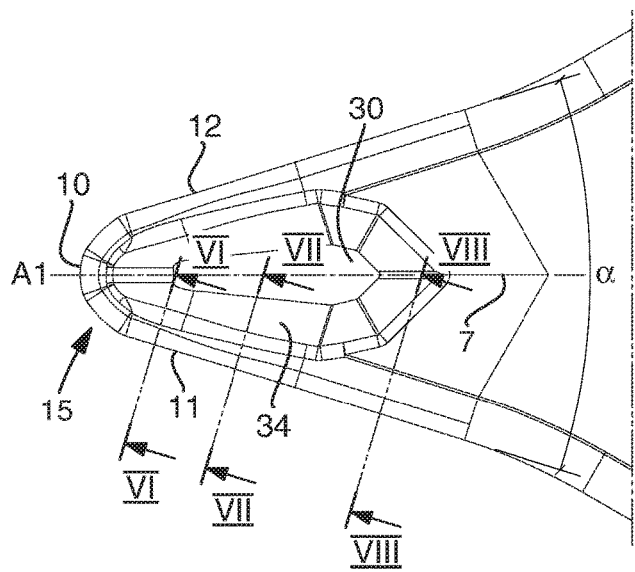
FIG. 5 is a top view of a top surface of a nose portion of the first turning insert.

FIG. 5 shows a top view of a nose portion 15 of the first turning insert, having a first 11 and a second 12 cutting edge connected by a convex nose cutting edge 10. The first 11 and second 12 cutting edges on or at the same nose portion 15 form a nose angle α of 25-50° relative to each other, and the first 11 and second 12 cutting edges converge at a point (not shown) outside of the turning insert. A bisector 7 is located between, and at equal distances from, the first 11 and second 12 cutting edges. The bisector 7 intersects the nose cutting edge 10 at the center thereof.

A protrusion 30 is formed in the top surface of the turning insert, which protrusion has the major extension thereof along the bisector. The protrusion includes a first chip breaker wall 34 facing towards the first cutting edge, and a second chip breaker wall facing the second cutting edge. The distance, measured in a direction perpendicular to the first cutting edge 11, and in a plane parallel to a reference plane RP, from the first cutting edge 11 to the first chip breaker wall 34 is increasing away from the nose cutting edge 10. This gives improved chip control especially in a turning operation as in FIG. 2. The protrusion 30, and thus the first chip breaker wall 34, has a shorter extension than the first cutting edge 11.

Figure 9:
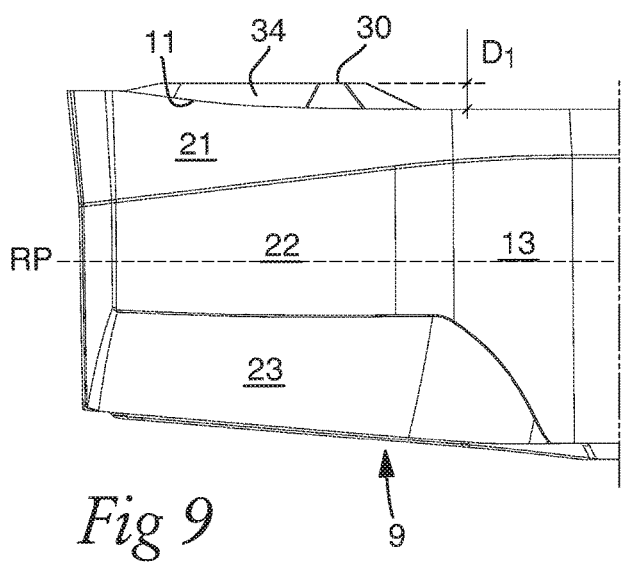
FIG. 9 is a side view of the nose portion in FIG. 5.

FIG. 9 shows a side view of the nose portion in FIG. 5. A bottom surface 9 is located opposite a top surface. The reference plane RP is located between and at equidistant length from the top and bottom 9 surfaces. Although the top and bottom surfaces are not flat, the reference plane RP can be positioned such that it is parallel to a plane intersecting the three nose cutting edges. A side surface 13 connects the top surface and the bottom surface 9. The side surface 13 includes a first clearance surface 21 adjacent to the first cutting edge 11, a third clearance surface 23 adjacent to the bottom surface 9, and a second clearance surface 22 located between the first clearance surface 21 and the third clearance surface 23.

The distance from the first cutting edge 11 to lower border line of the first clearance surface 21, i.e. the border line of the first clearance surface 21 located closest to the bottom surface 9, is decreasing away from the nose cutting edge. The height, in a direction perpendicular to the reference plane RP, of the first clearance surface 21 is less than the height of the second clearance surface 22, in order to further increase the strength of the first cutting edge 11. The height of the first clearance surface 21 is at least 0.3 mm in order to compensate for flank wear of the first cutting edge 11.

The first cutting edge 11 slopes towards the bottom surface 9 and the reference plane RP slopes away from the nose cutting edge 10. The distance from the first cutting edge 11 to the reference plane RP varies in such a way that that this distance is decreasing at an increasing distance from the nose cutting edge 10, at least for a portion of the first cutting edge 11. A distance from the reference plane RP to a first portion of the first cutting edge 11, located adjacent to the nose cutting edge 10, is greater than a distance from the reference plane RP to a second portion of the first cutting edge 11, located further away from the nose cutting edge 10. By such orientation of the first cutting edge 11, the chip control is improved in axial turning away from the clamping end, as e.g. in an operation as seen in FIG. 2. A distance D1 is measured in a direction perpendicular to the reference plane RP, representing the distance between the top surface of the protrusion 30 and the lowest point of the first cutting edge 11. D1 is 0.28-0.35 mm. By this, the chip breaking and/or chip control is further improved, in an operation as seen in FIG. 2.

Figure 6:
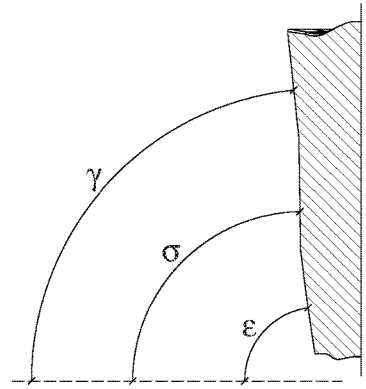
FIGS. 6-8 are detailed cross-sectional views taken along the lines VI-VI, VII-VII and VIII-VIII, respectively, in FIG. 5.
Figure 7:
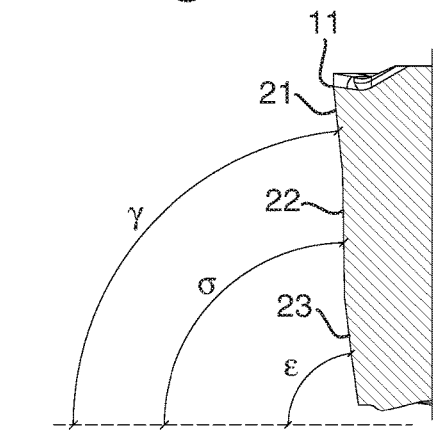
Figure 8:
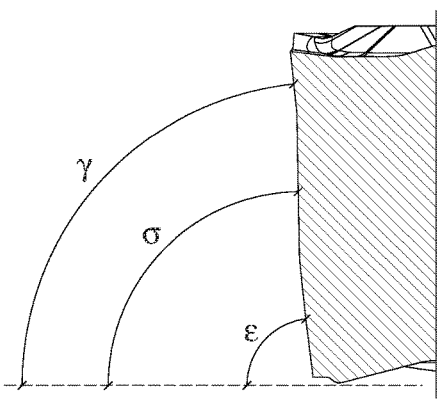

FIGS. 6-8 show cross-sectional views taken along the lines VI-VI, VII-VII and VIII-VIII, respectively, in FIG. 5. The sections are perpendicular to the first cutting edge 11 in planes perpendicular to the reference plane RP. In FIGS. 6-8, the angles which the first, second and third clearance surfaces 21, 22, 23 form in relation to a plane parallel to the reference plane RP and intersecting the bottom surface 9 are designated γ, σ and ε, respectively. Angle σ is greater than angle ε. By this, out-facing can be made from a smaller work piece diameter with a reduced decrease in insert strength. Greater clearance angles are necessary at smaller diameters, but a great and constant clearance angle would give a reduced strength of the insert.

The second clearance surface 22 has the purpose of increasing the strength of the insert. The third clearance surface 23 is adjacent to the bottom surface. Angle γ is greater than angle ε. Angle σ is greater than γ. The third clearance surface 23 is convex or substantially convex, seen in cross section as in FIGS. 6-8, in order to further improve the lower diameter range, i.e. the minimum diameter where the turning insert can function in an out facing operation, while minimizing the reduction of insert strength.

The configuration of second cutting edge 12, and the side surface 13 adjacent to the second cutting edge 12 are in accordance with the configuration of the first cutting edge 11, and the side surface 13 adjacent to the first cutting edge 11, which has been described in relation to FIGS. 5-8 above.

FIG. 10 shows a method to form a surface 53 on a metal work piece comprising a first machining step. A known turning insert 1 is provided. The turning insert 1 includes an active nose portion 15. The active nose portion 15 includes a first cutting edge 11, a second cutting edge 12 and a convex nose cutting edge 10 connecting the first 11 and second 12 cutting edges. A nose angle α formed between the first 11 and second 12 cutting edges is less than or equal to 85°. The nose angle α is at least 25°. In FIG. 10, the nose angle α is 80°. The second cutting edge 12 forms a back clearance angle ψ of more than 90° in a feed direction 99. If a subsequent or prior machining step is an out-facing operation, the back clearance angle ψ is at least 100°. For example, the back clearance angle ψ is less than 120°. The back clearance angle ψ is constant in relation to the feed direction 99 during the formation of the surface 53.

All parts of the turning insert 1 are ahead of the active or surface generating nose cutting edge 10 in the feed direction 99. Alternatively formulated, all parts of a top surface of the turning insert are ahead of a trailing portion of the nose cutting edge in the feed direction.

One first point of the nose cutting edge 10 is the part of the turning insert 1 that is located closest to the rotational axis of the metal work piece. One second point, or trailing point, of the nose cutting edge 10, which is behind the first point in the feed direction 99, is the part of the turning insert 1 that is located most rearward in the feed direction 99 or in the direction of insert movement. The first point of the nose cutting edge 10 is located on the same side of a bisector as the first cutting edge 11, wherein the bisector is a line which is between the first and second cutting edges 11, 12 at equal distance from the first and second cutting edges 11, 12. The second point of the nose cutting edge 10 is located on the same side of the bisector as the second cutting edge 12. The first cutting edge 11 and the second cutting edge 12 are located on opposite sides of the convex nose cutting edge 10.

The first, second and nose cutting edges 11, 12, 10 are formed at borders of a top surface of the turning insert 1, which top surface includes a rake face. The expression "positioning all parts of the turning insert ahead of the nose cutting edge in the feed direction" thus can alternatively be formulated as "positioning all parts of a top surface of the turning insert ahead of a trailing portion of the nose cutting edge in the feed direction."

All parts of the turning tool 3, including the turning insert 1 and a tool body 2, are ahead of the active or surface generating nose cutting edge 10 in the feed direction. Thus, all parts of the tool body 2 are ahead of the nose cutting edge 10 in the feed direction 99. The turning tool 3 is clamped or connected to a turning lathe, such as a CNC-machine or CNC-lathe (not shown). A metal work piece, on which the surface 53 is formed, rotates around a rotational axis (not shown).

The tool body 2 includes a front end and a rear end, a main extension along a longitudinal axis A2 extending from the front end to the rear end, and an insert seat formed in the front end in which the turning insert 1 is mounted. The longitudinal axis A2 of the tool body 2 is perpendicular to the rotational axis of the metal work piece.

The turning insert 1 moves in a direction, defined by the feed direction 99, which is parallel to or at an angle less than 45° relative to the rotational axis. In FIG. 10, the feed direction 99 is parallel to the rotational axis of the metal work piece. The first cutting edge 11 is active and ahead of the nose cutting edge 10 in the feed direction 99. The first cutting edge is active, i.e. cuts metal, at an entering angle κ1, which is above 0°. The entering angle κ1 can be at least 5°.

For example, the entering angle κ1 is in the range of 10-45°. In FIG. 10, the entering angle κ1 is around 5°. A larger entering angle κ1 shall be chosen if a larger depth of cut is needed.

The first cutting edge 11 is a leading edge. The second cutting edge 12 is a trailing edge. The surface 53 is at least partly formed by the nose cutting edge 10. The surface 53, which is formed is a rotational symmetrical surface, i.e. a surface 53, which has an extension along the rotation axis of the metal work piece and where in cross sections perpendicular to the rotational axis, each portion of the rotational symmetrical surface 53 is located at a constant distance from the rotation axis of the metal work piece, where a constant distance is a distance which is within 0.10 mm, for example within 0.05 mm.

The rotational symmetrical surface 53 can be in the form of e.g. a cylindrical surface or a conical surface or a frustoconical surface or a tapered surface. The rational symmetrical surface 53 that is generated or formed at least partly by the nose cutting edge 10 has a wavy shape with small peaks and valleys, and the wavy shape is influenced at least partly by the curvature of the nose radius and the feed rate. The wave height can be less than 0.10 mm, for example, less than 0.05 mm. The active nose cutting edge 10 is the part of the turning insert 1 and the part of the turning tool 3 which is closest to the rotational axis of the metal work piece.

Figure 11:
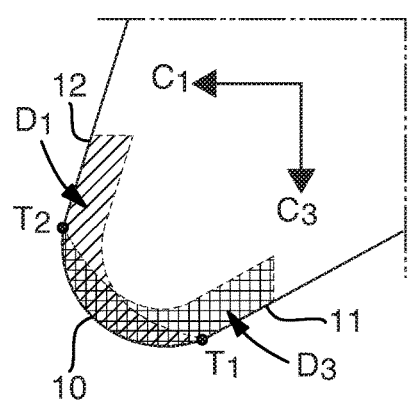
FIG. 11 is a schematic top view of a nose portion of a conventional turning insert, showing wear from conventional turning.

FIG. 11 shows the principle of conventional turning, where C1 represents the feed direction in FIG. 1, and D1 represents the wear on or at a nose portion from such operation. C3 represents a conventional facing operation, i.e. feed perpendicular and towards the rotational axis A3, and D3 represents the wear on or at a nose portion from such operation. The second cutting edge 12 is the main cutting edge in C1 feed direction. The first cutting edge 11 is the main cutting edge in C3 feed direction. A convex nose cutting edge 10 connects the first and second cutting edges 11, 12. Transition points T1, T2 represent the transition between the nose cutting edge 10 and the first 11 and second 12 cutting edge, respectively. The wear D1, D3, is dependent on both the depth of cut and the feed rate. However, it is clear that D1 and D3 overlap, resulting in high wear at the nose cutting edge 10, or at least at a center portion of the nose cutting edge 10.

Figure 12:
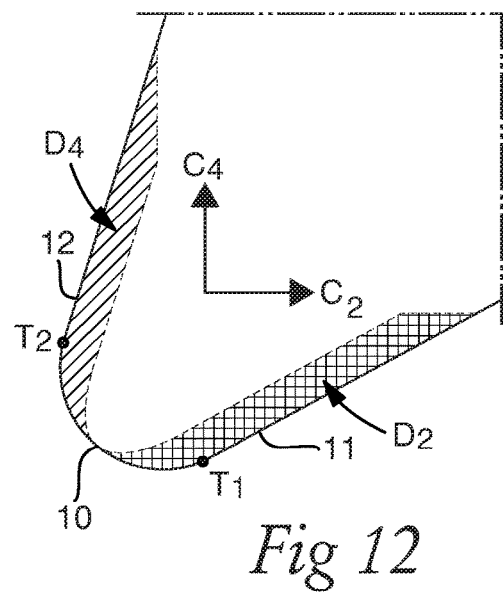
FIG. 12 is a schematic top view of a nose portion, showing wear from turning in FIG. 13.

FIG. 12 shows the principle of an alternative turning method. C2 represents the main feed direction in FIG. 2, or the main feed direction in pass 2, 4, 6 and 8 in FIG. 13, i.e. an axial feed direction away from the clamping end of the metal work piece. D2 represents the wear on or at a nose portion from such operation. C4 represents an out-facing operation, i.e. feed perpendicular to and away from the rotational axis A3, as seen in the main feed directions in pass 1, 3, 5 and 7 in FIG. 10. D4 represents the wear on or at a nose portion from such operation. The second cutting edge 12 is the main cutting edge in C4 feed direction. The first cutting edge 11 is the main cutting edge in C2 feed direction. A convex nose cutting edge 10 connects the first and second cutting edges 11, 12. Transition points T1, T2 represent the transition between the nose cutting edge 10 and the first 11 and second 12 cutting edge, respectively.

Each wear D2, D4, is dependent on both the depth of cut and the feed rate. However, it is clear that D2 and D4 do not overlap, or at least overlap to a lesser degree than in FIG. 11, resulting in reduced wear at the nose cutting edge 10, or at least reduced wear at a center portion of the nose cutting edge 10. The wear of the first and second cutting edges 11, 12 has a wider range, i.e. is distributed over a longer distance, compared to FIG. 11. However, because the smaller entering angles in feed C2 and C4 compared to the greater entering angles in C1 and C3, the chip thickness in FIG. 12 will be thinner and therefor give relatively small wear. At constant feed rate and depth of cut, the area of D2 is equal to the area of D3, and the area of D1 is equal to the area of D4.

Figure 13:
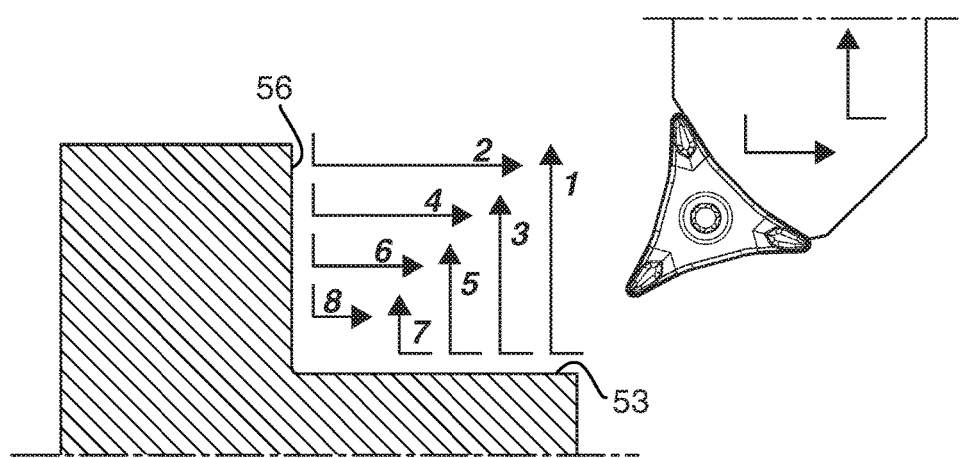
FIG. 13 is a schematic view illustrating turning of a 90° corner by the first turning insert.

FIG. 13 show an example of a machining sequence using the first turning insert. The left-hand side is the clamping end of the metal work piece. A 90° corner including a cylindrical surface 53 and a flat surface 56 is formed by turning. A sequence of steps 1-8 is shown. The entry for each step is shown as being perpendicular to the main feed direction of each step. The main feed direction in steps 1, 3, 5 and 7 is perpendicular to and away from the rotational axis A3. The main feed direction in steps 2, 4, 6 and 8 is parallel to the rotational axis A3 and away from the clamping end. The entry for each cut is preferably as described in connection to FIG. 2. The wear of the turning insert 1 after the sequence of steps showed in FIG. 13 is similar or identical to the wear shown in FIG. 12.

FIGS. 16a-17c further describe the first turning insert, as well as a turning tool 3 which includes the turning insert 1 and a tool body 2. The turning insert 1 includes a top surface 8, which is or includes a rake face, and an opposite bottom surface 9, functioning as a seating surface. A reference plane RP is located parallel to and between the top surface 8 and the bottom surface 9. A center axis A1 extends perpendicular to the reference plane RP and intersects the reference plane RP, the top surface 8 and the bottom surface 9. A hole, for a screw, having openings in the top surface 8 and the bottom surface 9 is concentric with the center axis A1. The turning insert 1 includes side surfaces 13, 13', 13", functioning as clearance surfaces, connecting the top surface 8 and the bottom surface 9.

Three nose portions 15, 15', 15" are formed symmetrically relative to or around the center axis A1. The nose portions 15, 15', 15" are identical. Each nose portion 15, 15', 15" includes a first cutting edge 11, a second cutting edge 12 and a convex nose cutting edge 10 connecting the first 11 and second 12 cutting edges. The nose cutting edges 10, 10', 10" are located at a largest distance from the center axis A1, i.e. at a larger distance from the center axis A1 than all other parts of the turning insert. In a top view, seen in FIG. 16d, the first 11 and second 12 cutting edges on or at the same nose portion 15 forms a nose angle α of 25-50° relative to each other, in FIG. 16d the nose angle α is 35°.

Figure 16A:
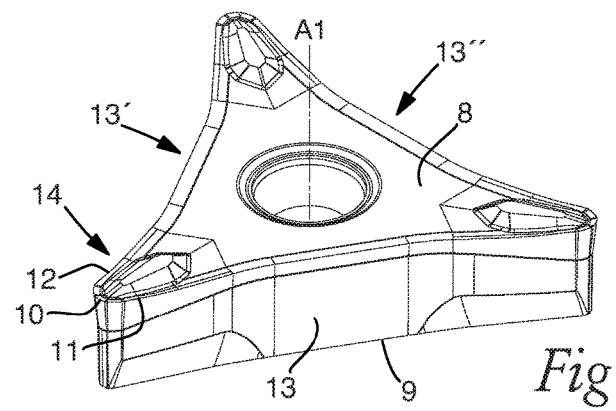
FIG. 16a is a perspective view showing the first turning insert.
Figure 16B:
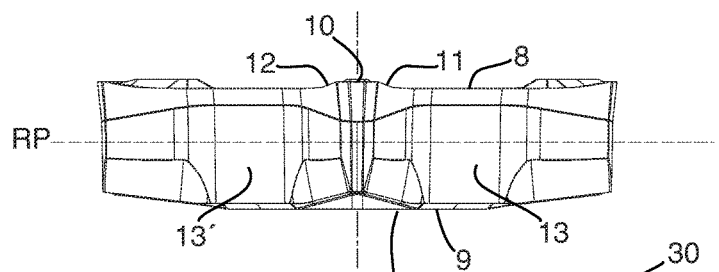
Figure 16C:
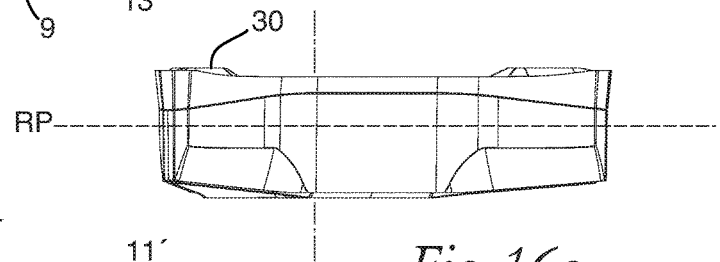
Figure 16D:
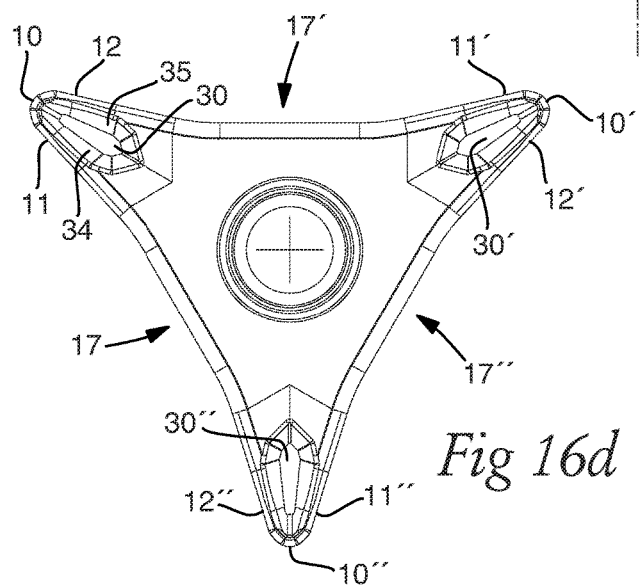

In a side view, such as in FIG. 16b, at least a portion of the first and second cutting edges 11, 12 on or at each nose portion 15, 15', 15" slopes towards the bottom surface, such that in a side view, the first and second cutting edges 11, 12 have the highest points thereof bordering to the nose cutting edge 10 on or at the same nose portion 15. In other words, the distance from the first cutting edge 11 and the second cutting edge 12 to the reference plane RP varies in such a way that that this distance is decreasing at an increasing distance from the nose cutting edge 10.

The first and second cutting edges 11, 12 are linear or straight, or substantially linear or straight in a top view. Bisectors 7, 7', 7" extend equidistantly from each pair of first 11, 11', 11" and second 12, 12', 12" cutting edges. Each bisector 7, 7', 7" intersects the center axis A1. Indentations 17, 17', 17" are formed between each pair of nose cutting edges 10, 10', 10".

Figure 18A:
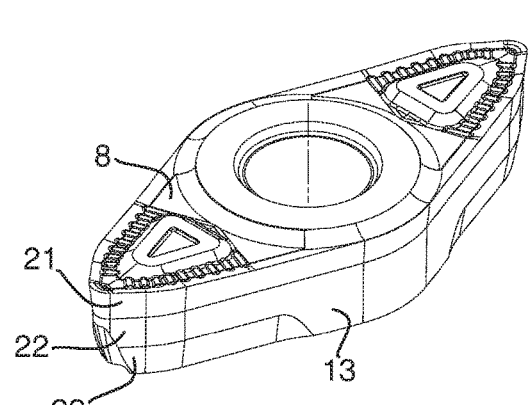
FIG. 18a s a perspective view showing a fourth turning insert.
Figure 18B:
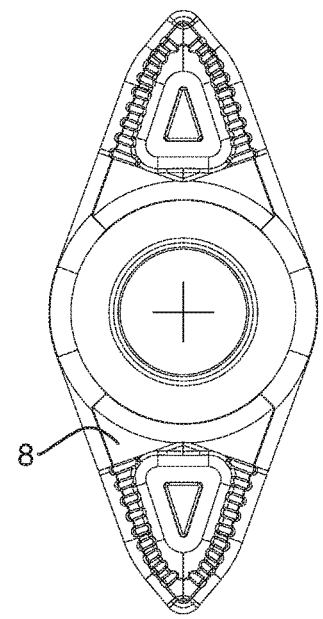
Figure 18C:
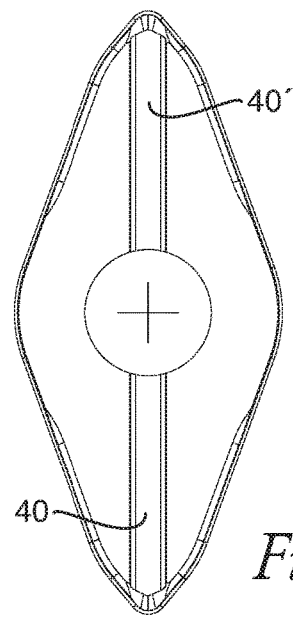
Figure 18D:
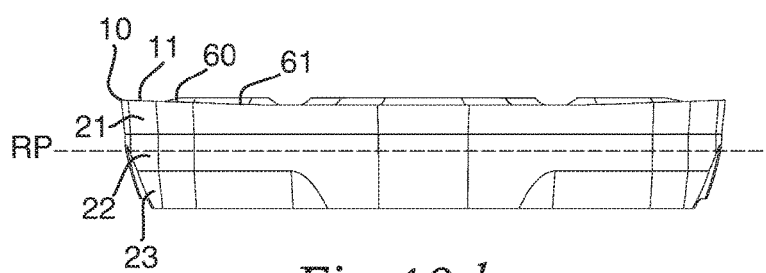
Figure 18E:
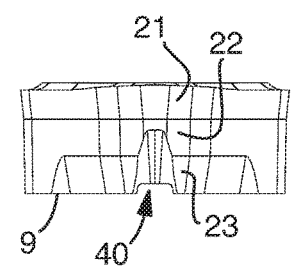
Figure 19A:
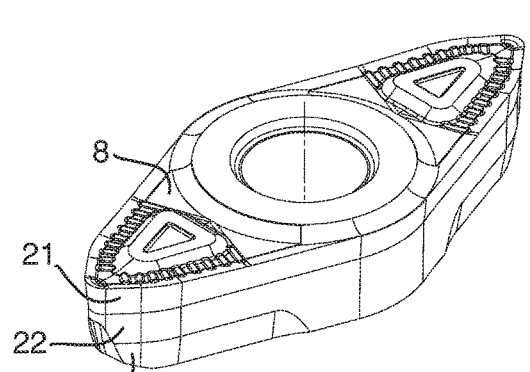
FIG. 19a is a perspective view showing a fifth turning insert.
Figure 19B:
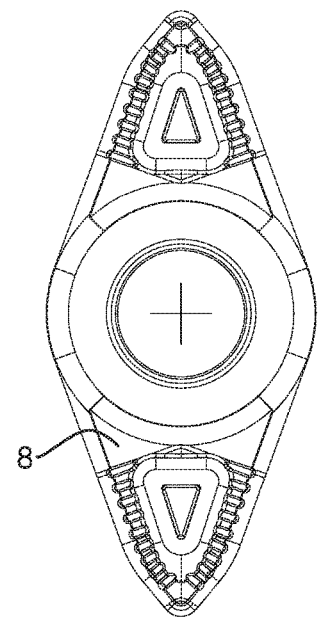
Figure 19C:
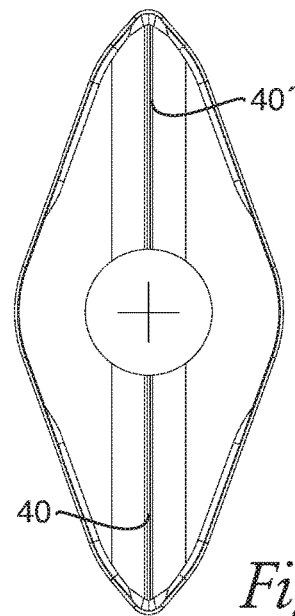
Figure 19D:
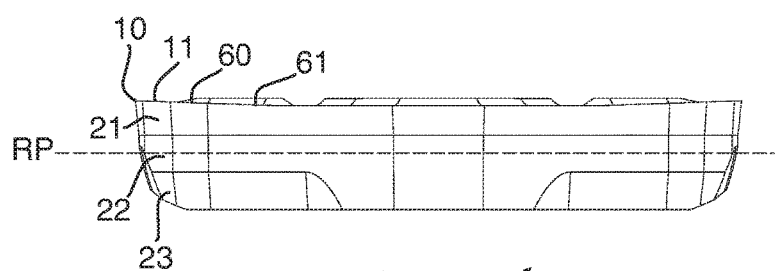
Figure 19E:
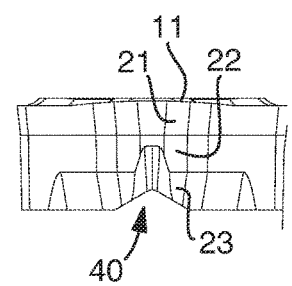
Figure 20A:
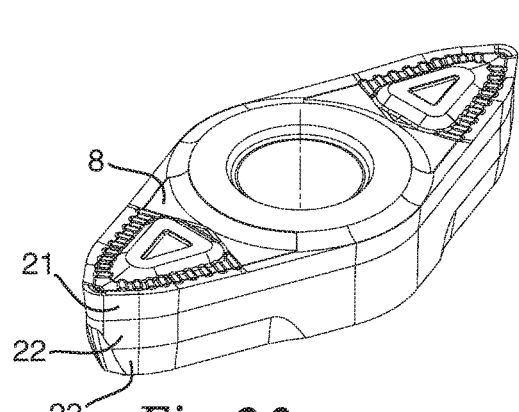
FIG. 20a is a perspective view showing a sixth turning insert.
Figure 20B:
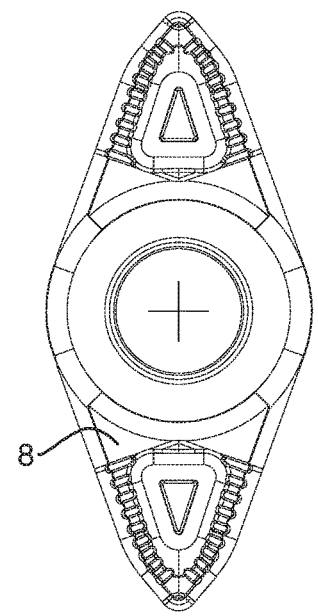
Figure 20C:
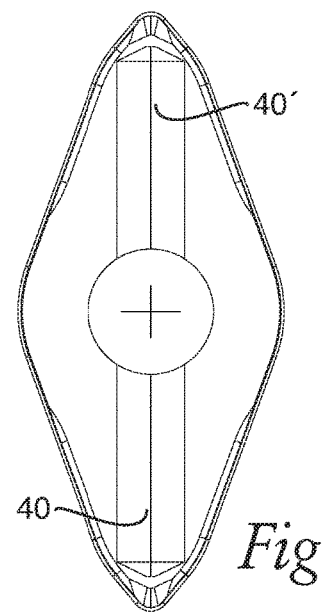
Figure 20D:
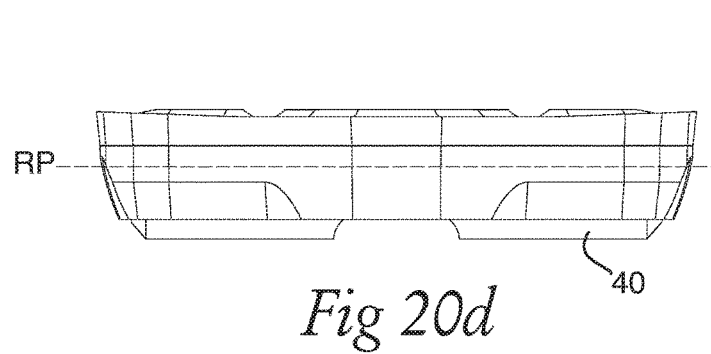
Figure 20E:
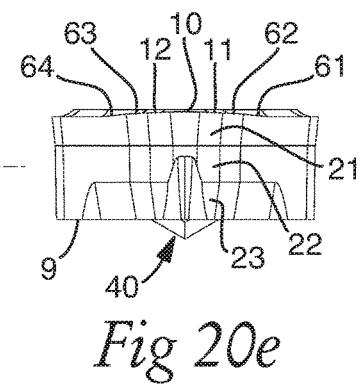
Figure 21A:
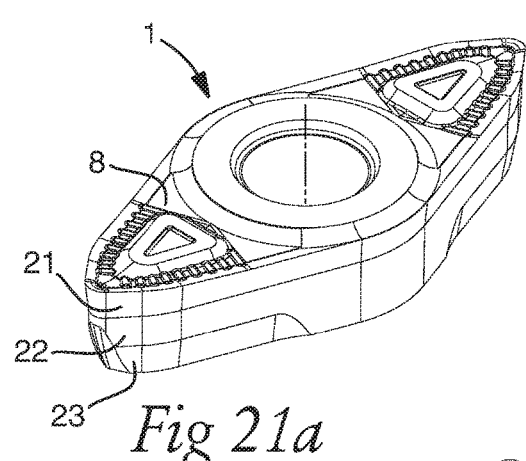
FIG. 21a is a perspective view showing a seventh turning insert.
Figure 21B:
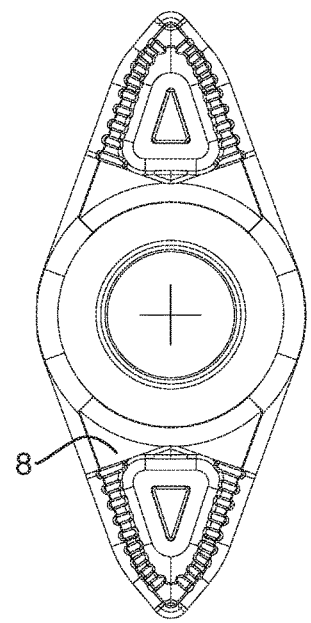
Figure 21C:
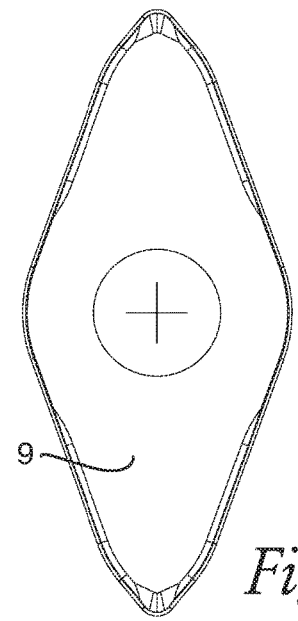
Figure 21D:
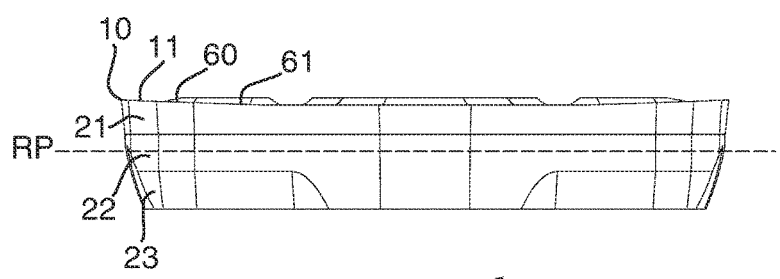
Figure 21E:
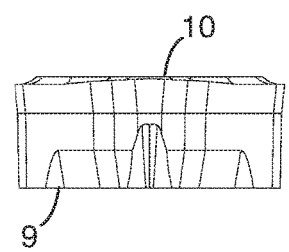
Figure 22A:
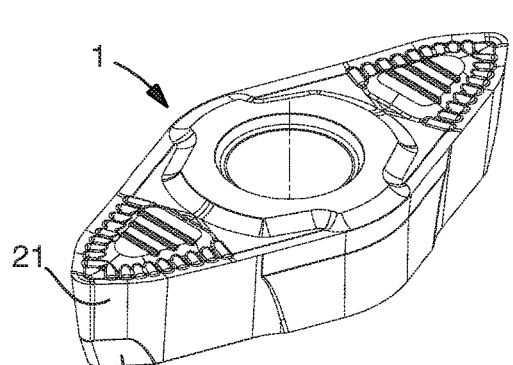
FIG. 22a is a perspective view showing an eighth turning insert.
Figure 22B:
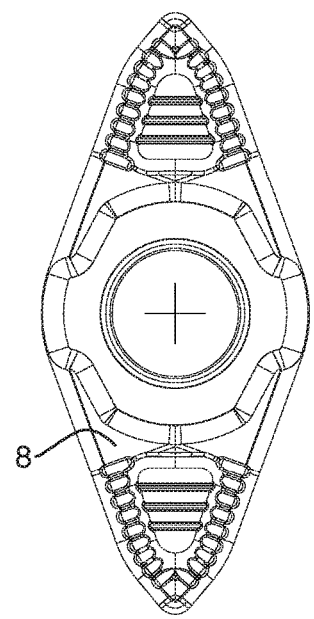
Figure 22C:
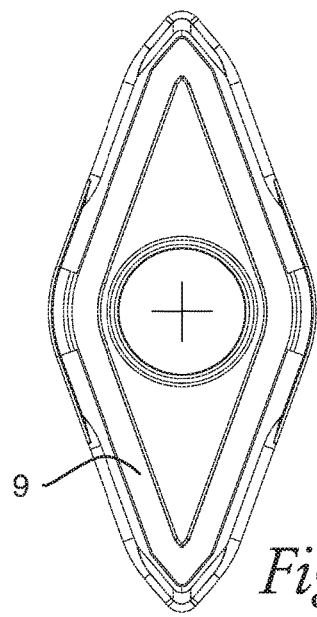
Figure 22D:
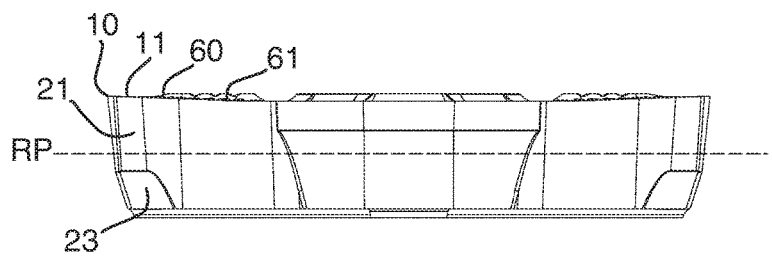
Figure 22E:
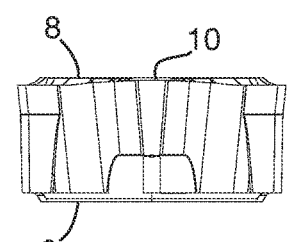

The bottom surface 9, seen in FIGS. 18a and 18b, includes rotation prevention means, with the purpose of reducing the tendency for the turning insert 1 to rotate around the center axis A1 during cutting, in the form of three grooves 40, 40', 40", each groove 40, 40', 40" having a main extension in the same direction as the bisector 7, 7', 7" located adjacent the closest first 11 and second 12 cutting edges. Each groove 40, 40', 40" includes two seating surfaces, for example, at an obtuse angle, 100-160°, in relation to each other.

Figure 17A:
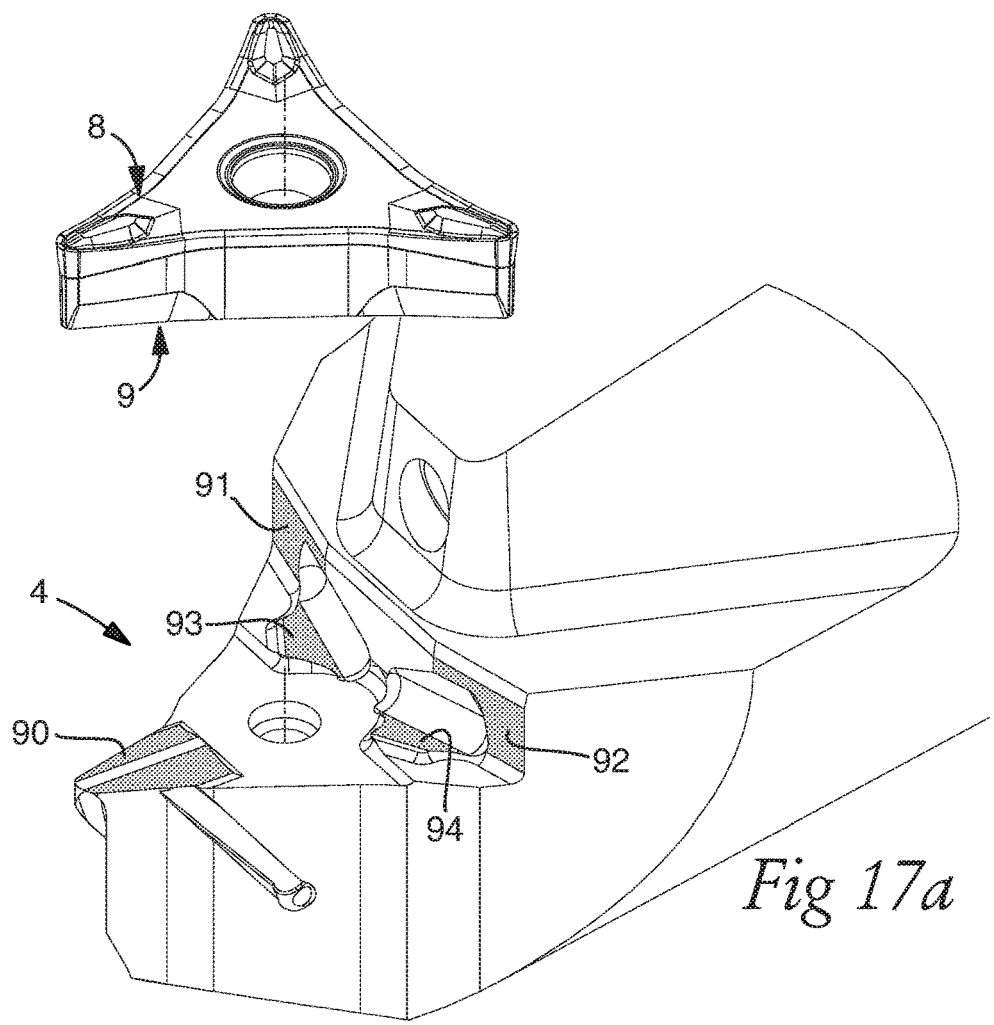
FIG. 17a is a perspective view showing the turning insert In FIG. 16a and a tool body.
Figure 17B:
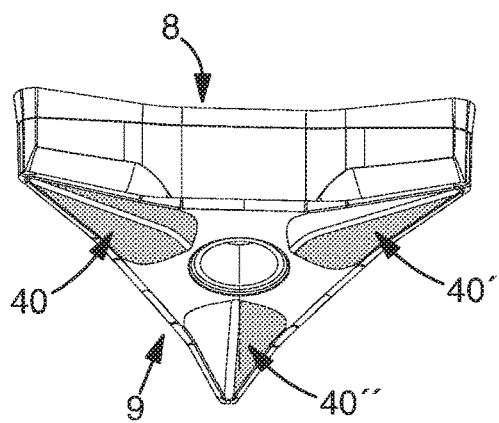
FIG. 17b is a perspective view showing the bottom surface of the turning insert in FIG. 16a FIG. 17c is a further perspective view showing the bottom surface of the turning insert in FIG. 16a FIG. 17d is a perspective view showing the turning insert in FIG. 15a seated in a tool body.
Figure 17C:
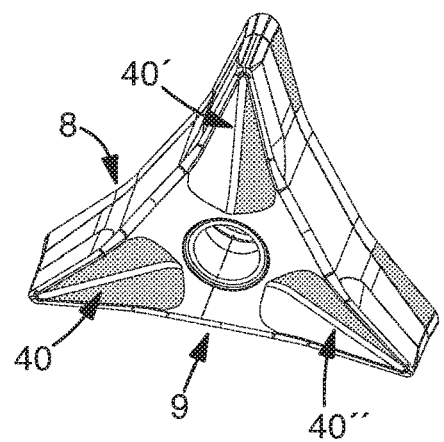
FIG. 17e is a perspective view showing the turning insert in FIG. 15a and a tool body.
FIG. 17f is a top view showing the turning insert and the tool body in FIG. 17d.
Figure 17D:
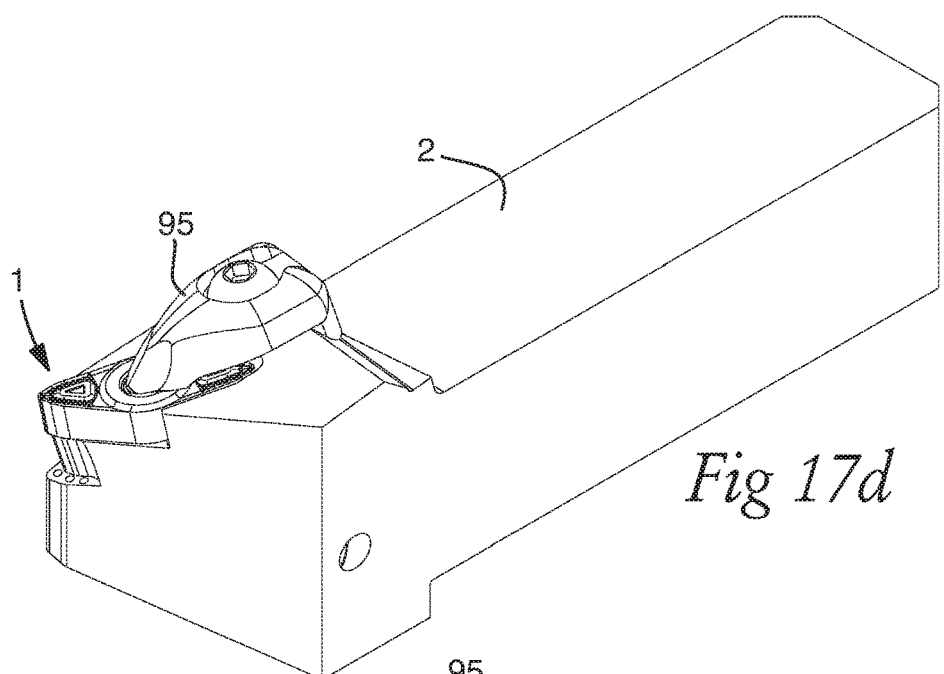
Figure 17E:
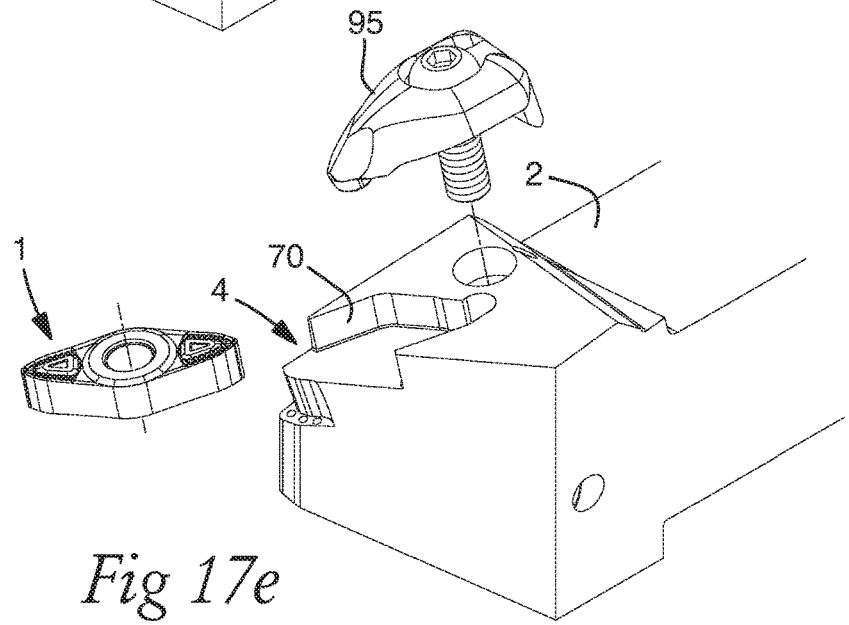
Figure 17F:
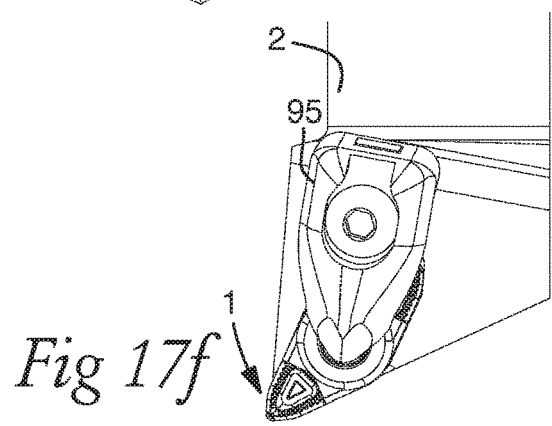

The turning insert 1 is intended to be securely clamped, by clamping means such as a screw or a top clamp, in an insert seat 4 located at a front end of a tool body 2, as seen in FIG. 17a. The contact between the insert seat 4 and the turning insert will now be described, see the shaded areas in FIG. 17c and FIG. 17a. The active nose cutting portion 15 is the part of the insert where groove 40 is located in FIG. 17c. The two seating surfaces of groove 40 are in contact with two surfaces of a ridge 90 in the bottom of the insert seat 4. One surface of each other groove 40', 40", the surfaces located at the largest distance from the active nose cutting edge 10, are in contact with bottom surfaces 93, 94 in the bottom of the insert seat 4. At least portions of the side surface 13 located at the greatest distance from the active nose cutting edge 10 may be in contact with rear seating surfaces 91, 92 formed at a rear end of the insert seat 4.

FIGS. 14a-f show a second turning insert 1, as well as, a turning tool 3, which includes the turning insert 1 and a tool body 2. The turning insert 1 includes a top surface 8, which is or provides a rake face, and an opposite bottom surface 9, functioning as a seating surface. The top 8 and bottom 9 surfaces are identical. This means that while in a first position, the top surface 8 functions as a rake surface, when the insert is turned upside down, the same surface is now functioning as a seating surface.

A reference plane RP is located parallel to and between the top surface 8 and the bottom surface 9. A center axis A1 extends perpendicular to the reference plane RP and intersects the reference plane RP, the top surface 8 and the bottom surface 9. A hole for a screw, having openings in the top surface 8 and the bottom surface 9 is concentric with the center axis A1.

The turning insert 1 includes side surfaces 13, 13', 13", functioning as clearance surfaces, connecting the top surface 8 and the bottom surface 9. Three nose portions 15, 15', 15" are formed symmetrically relative to or around the center axis A1. The nose portions 15, 15', 15" are identical. Each nose portion 15, 15', 15" includes a first cutting edge 11, a second cutting edge 12 and a convex nose cutting edge 10 connecting the first 11 and second 12 cutting edges. The nose cutting edges 10, 10', 10" are located at a largest distance from the center axis A1, i.e. at a larger distance from the center axis A1 than all other parts of the turning insert.

Figure 14A:
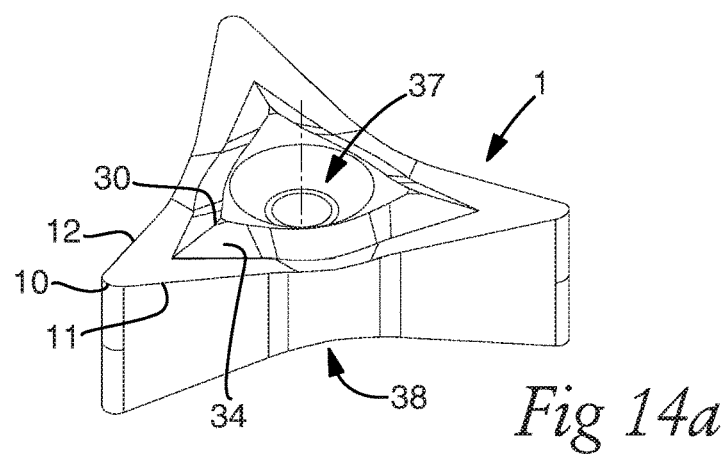
FIG. 14a is a perspective view showing a second turning insert.
Figure 14B:
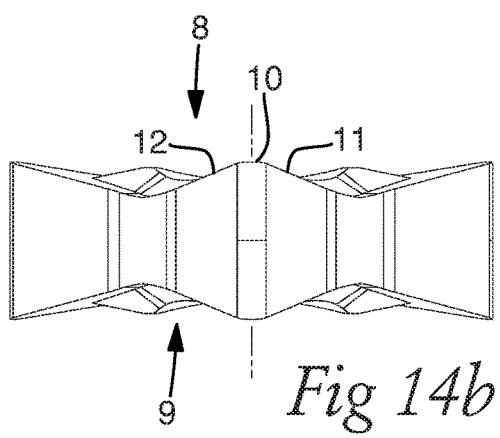
Figure 14C:
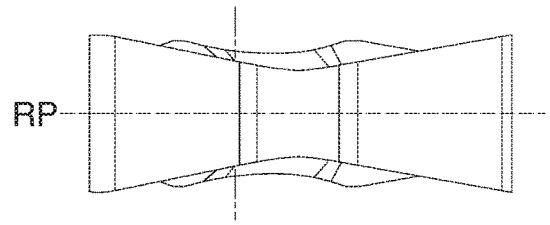
Figure 14D:
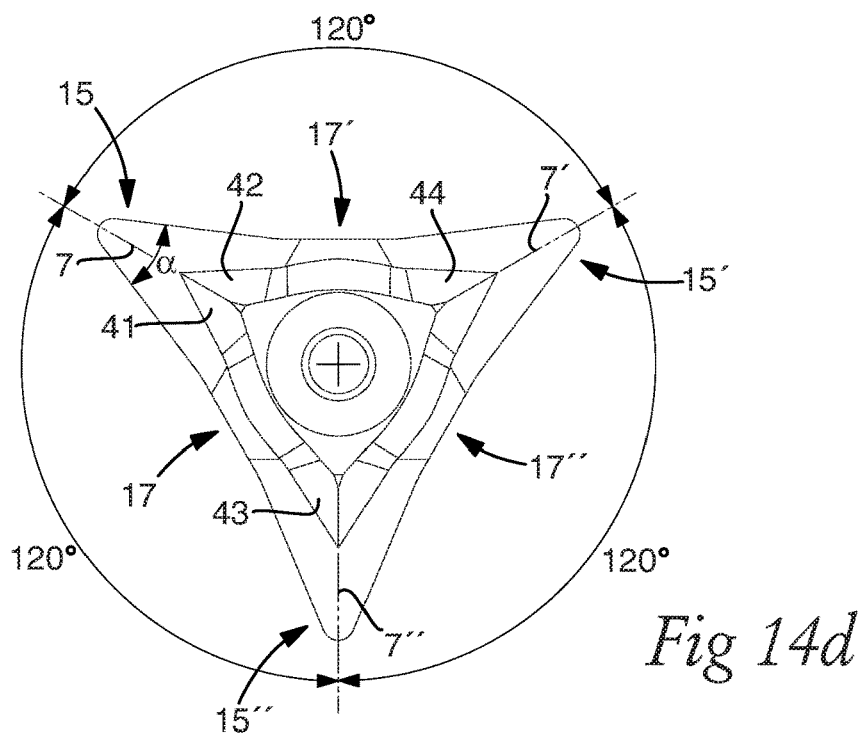

In a top view, seen in FIG. 14d, the first 11 and second 12 cutting edges on or at the same nose portion 15 form a nose angle α of 25-50° relative to each other, in this case 45°. In a side view, seen in FIG. 14b, at least a portion of the first and second cutting edges 11, 12 on or at each nose portion 15, 15', 15" slopes towards the bottom surface, such that in a side view, the first and second cutting edges 11, 12 have the highest points thereof adjacent to the nose cutting edge 10 on or at the same nose portion 15. In other words, the distance from the first cutting edge 11 and the second cutting edge 12 to the reference plane RP varies in such a way that that this distance is decreasing as the distance from the nose cutting edge 10 increases.

The first and second cutting edges 11, 12 are linear or straight, or substantially linear or straight in a top view. Bisectors 7, 7', 7" extend equidistantly from each pair of first 11, 11', 11" and second 12, 12', 12" cutting edges. Each bisector 7, 7', 7" intersects the center axis A1. Indentations 17, 17', 17" are formed between each pair of adjacent nose cutting edges 10, 10', 10". The turning insert 1 includes rotation prevention means in the form of a set of surfaces 41, 42, 43, 44, where each surface 41, 42, 43, 44 extends in a plane which forms an angle of 5-60° in relation to the reference plane RP. The set of surfaces 41, 42, 43, 44 are formed at a central ring-shaped protrusion 30, extending around the center axis A1. By such a configuration, the turning insert 1 can be made double-sided or reversible, giving an increased possible usage.

Figure 14E:
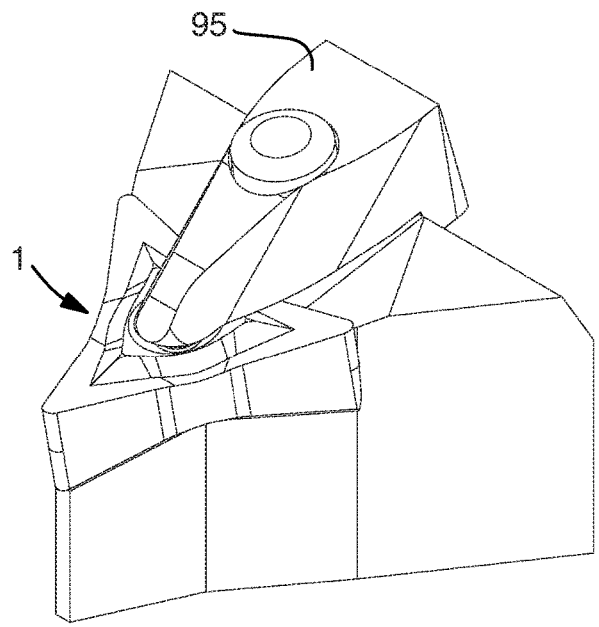
FIG. 14e is a perspective view showing the turning insert in FIG. 14a positioned in a partial tool body.

The first chip breaker wall 34 can be a part of the set of surfaces 41, 42, 43, 44. An alternative solution (not shown) is to arrange the first chip breaking wall 34 as part of a further protrusion (not shown) at a greater distance from the center axis A1. FIG. 14e show one possible clamping mode of the turning insert 1 by means of a clamp 95, which presses the insert and keeps the insert in the insert seat 4 of the tool body 2.

Figure 14F:
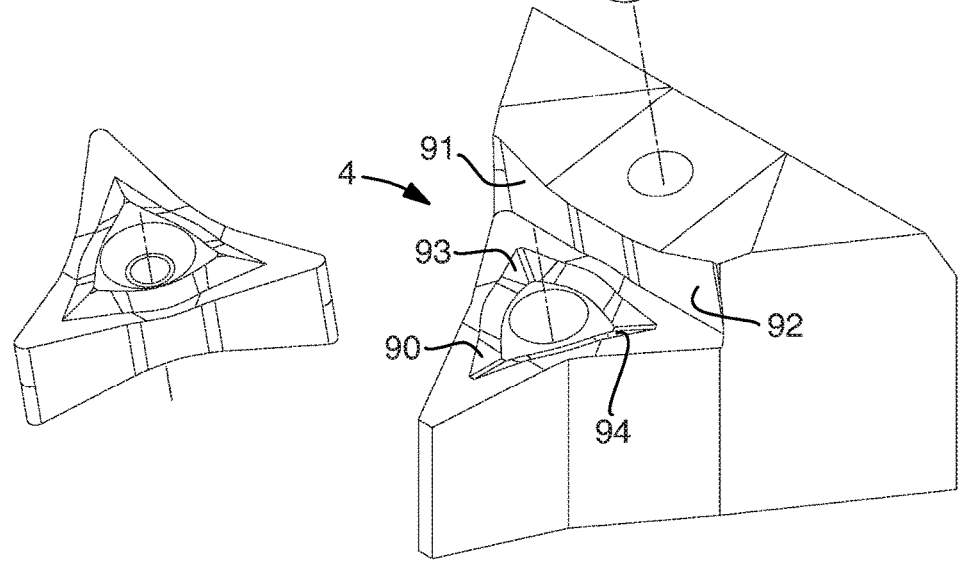
FIG. 14f is an exploded view showing the turning insert and tool body in FIG. 14e.

FIG. 14f shows the insert seat 4 in which the second turning insert 1 can be mounted by means of e.g. a top clamp 95. The side surface 13 located at a greatest distance from the active nose cutting edge 10 includes two surfaces, which are pressed against rear surfaces 91, 92 of the insert seat 4. The set of surfaces 41, 42, 43, 44 includes two front surfaces 41, 42, which are in contact with surfaces of a front portion 90 of the bottom of the insert seat 4. Front in this context is between the center axis A1 and the active nose cutting edge 10. The set of surfaces 41, 42, 43, 44 further includes two rear surfaces 43, 44, which are pressed against rear bottom surfaces 93, 94 which are located in the bottom surface of the insert seat 4, between the front portion 90 and the rear surfaces 91, 92 of the insert seat 4.

Figure 2A:
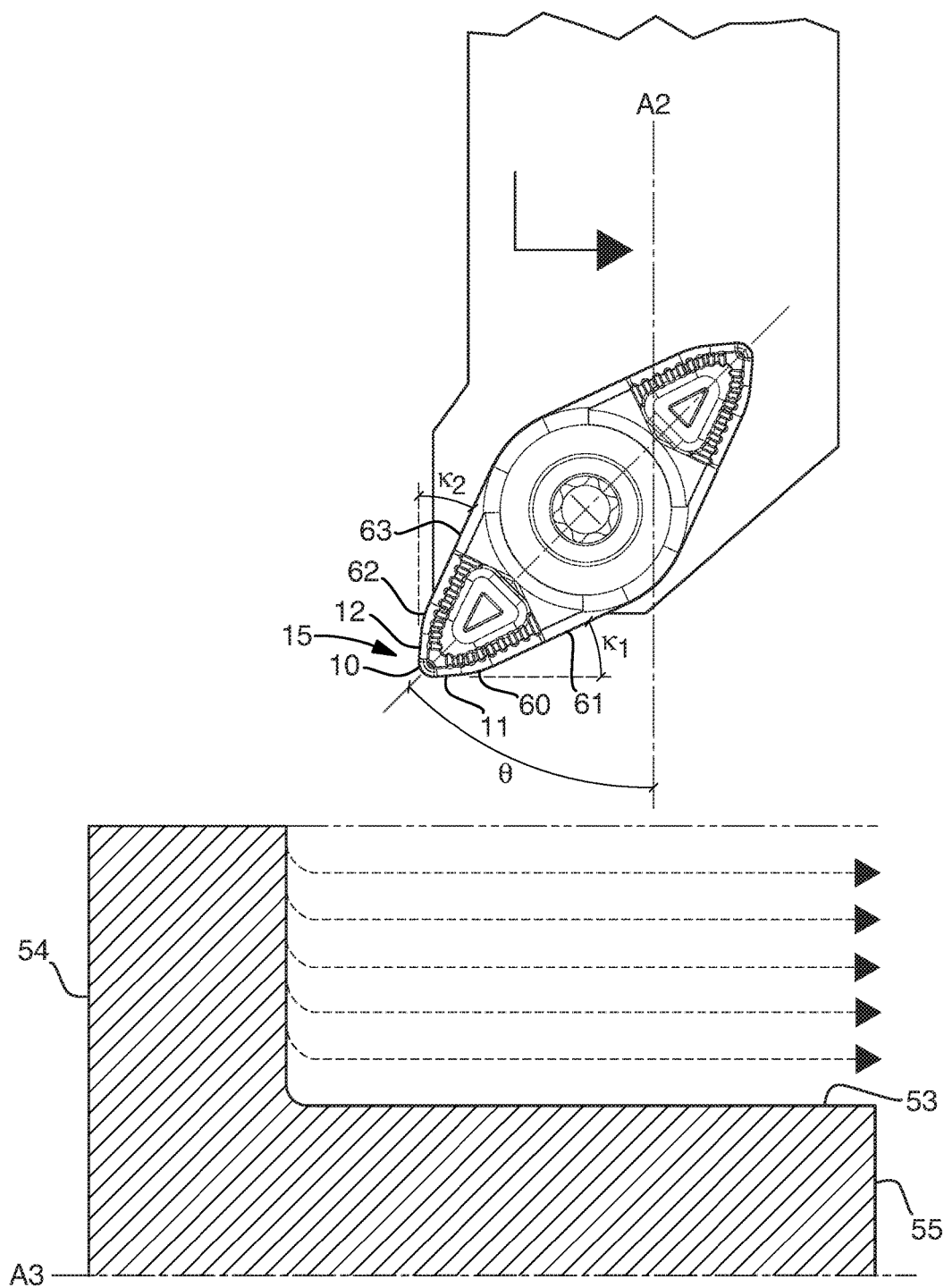
FIG. 2a is a schematic view showing turning of a cylindrical surface by a third turning insert.

Reference is made to FIG. 2a, which shows turning using a third turning insert. As in FIG. 1, a metal work piece is clamped by clamping jaws (not shown), which are pressed against an external surface at a first end 54, or clamping end, of the metal work piece. An opposite second end 55 of the metal work piece is a free end. The metal work piece rotates around a rotational axis A3. The turning insert, seen in top view, is securely and removably clamped in an insert seat or a pocket in tool body 2 by means of a screw. The tool body 2 has a longitudinal axis A2, extending from a rear end to a front end, in which the insert seat or pocket is located. In FIG. 2a, the feed is, to a greatest extent, axial, also called longitudinal feed, i.e. the direction of the feed is parallel to the rotational axis A3. In this way, an external cylindrical surface 53 is formed. At the entry of each cut, or immidiately prior to the axial feed, the feed has a radial component, in such a way that the turning insert move along an arc of a circle.

The turning insert includes two opposite and identical nose portions 15, 15' formed 180° relative each other around a center axis of the turning insert 1. Each nose portion 15, 15' includes a first cutting edge 11, a second cutting edge 12 and a convex nose cutting edge 10 connecting the first 11 and second 12 cutting edges. One nose portion 15, located closer to the rotational axis A3 than the opposite inactive nose portion 15', is active. Active means that the nose portion as placed such that it can be used for cutting chips from the metal work piece 50. A bisector 7 extending equidistantly from the first 11 and second 12 cutting edges, intersecting the center of the nose cutting edge 10 and a center axis A1 of the turning insert. The first and second cutting edges 11, 12 converge at a point (not shown) outside the turning insert. The bisector of the active nose portion 15 forms an angle θ, 40-50°, relative to the longitudinal axis A2.

In a top view the first 11 and second 12 cutting edges on the same nose portion 15 form a nose angle α of 70-85° relative to each other, which in FIG. 2a is 80°. A third convex cutting edge 60 is formed adjacent to the first cutting edge 11. A fourth cutting edge 61 is formed adjacent to the third cutting edge 60, further away from the nose cutting edge 10. A fifth convex cutting edge 62 is formed adjacent to the second cutting edge 12. A sixth cutting edge 63 is formed adjacent to the fifth cutting edge 62, further away from the nose cutting edge 10.

In top view, as in FIG. 2a, the first, second, fourth and sixth cutting edges 11, 12, 61, 63 are linear or straight, or substantially linear or straight. The main feed direction, towards the right in FIG. 2a, is parallell to the rotational axis A3 and away from the first end 54, or clamping end, of the metal work piece 50. In the feed direction, the fourth cutting edge 61 is active at an entering angle κ1 of 10-45°, for example, 20-40°, which in FIG. 2a is 30°. The fourth cutting edge 63 is the main cutting edge in the feed direction, i.e. the majority of the chips are cut by the fourth cutting edge 63, at least at moderate to high depth of cut. To a lesser degree, third cutting edge 60, the first cutting edge 11 and the nose cutting edge 10 are also active. The first cutting edge is ahead of the nose cutting edge 10 in the axial feed direction. All parts of the turning insert is ahead of the active nose cutting edge 10 in the feed direction. The second cutting edge 11, formed on the active nose portion 15, is inactive.

In the axial turning operation, chips can be directed away from the metal work piece in a trouble-free manner, especially compared to the machining shown in FIG. 1 where the feed is towards the clamping end and towards a wall surface. In the machining step in FIG. 2a, the turning insert 1 enters into the metal work piece 50 such that the nose cutting edge 10 moves along an arc of a circle. The turning insert 1 enters into the metal work piece 50, or goes into cut, such that the chip thickness during entry is constant or substantially constant. At the entry, the depth of cut is increased from zero depth of cut. Such preferred entry reduces the insert wear, especially the wear at the nose cutting edge 10. Chip thickness is defined as feed rate multiplied by entering angle. Thus, by choosing and/or varying the feed rate and the movement and/or direction of the turning insert during entry, the chip thickness can be constant or substantially constant. The feed rate during entry can be less or equal than 0.50 mm/revolution. The chip thickness during entry is less than or equal to the chip thickness during subsequent cutting or machining.

If the feed direction would be radial, in such a way that the feed direction would be perpendicular to and away from the rotational axis A3, the sixth cutting edge 63 would be active at an entering angle κ2 of 10-45°, for example, 20-40°.

The cylindrical surface 53, or rational symmetrical surface, generated or formed at least partly by the nose cutting edge in FIGS. 1 and 2a, has a wavy shape with small peaks and valleys, and the wavy shape is influenced at least partly by the curvature of the nose radius and the feed rate. The wave height is less than 0.10 mm, for example, less than 0.05 mm. A thread profile is not a cylindrical surface 53 in this sense.

Figure 3A:
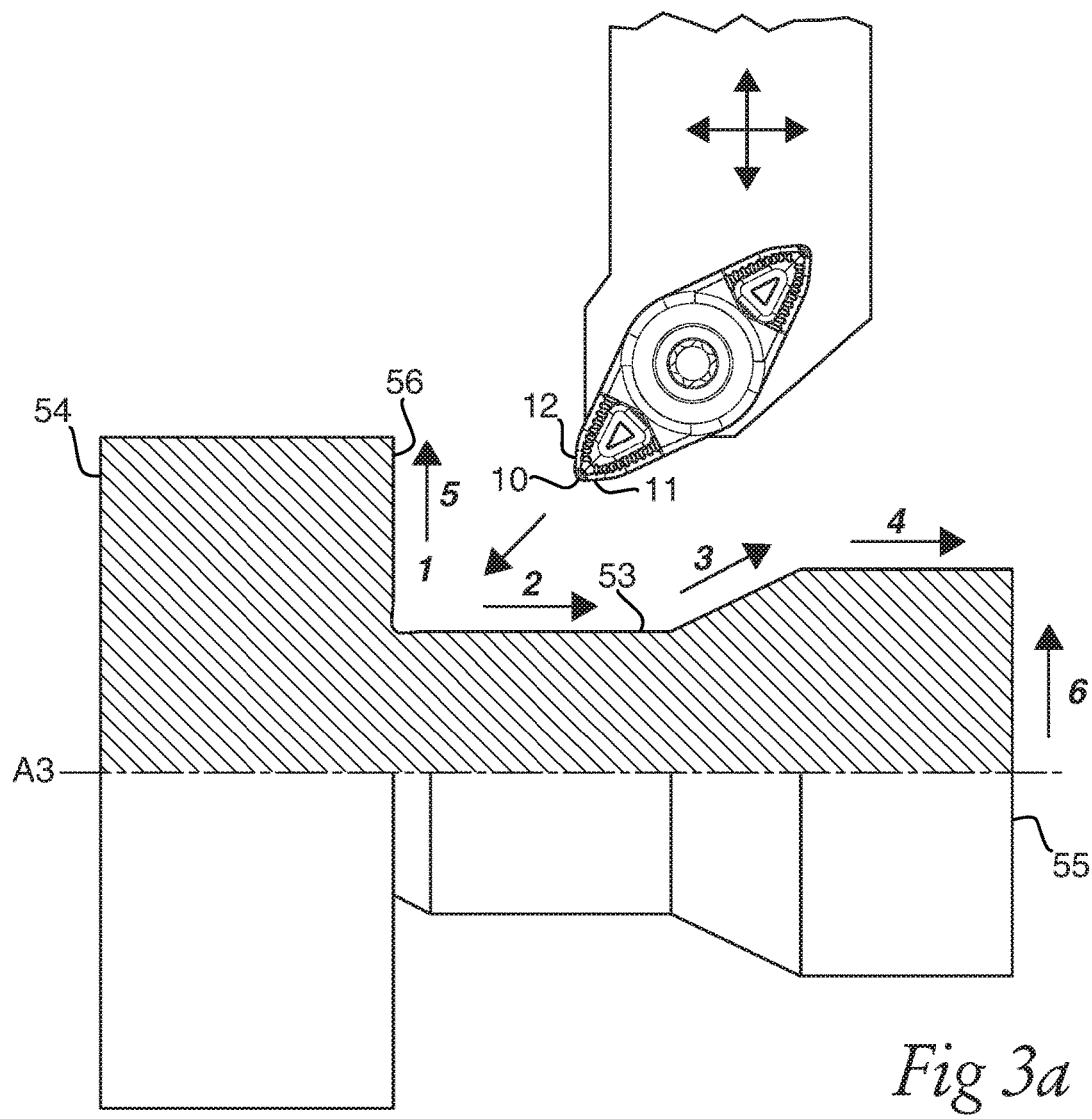
FIG. 3a is a schematic view showing turning, including axial turning and out-facing, of a metal work piece by a third turning insert.

In FIG. 3a, the turning insert and tool body in FIG. 2a can be seen in alternative machining operations, showing the versatile application area of the turning tool, especially with regard to feed direction. A machining sequence in six steps is shown. Step 1 is a undercutting operation. Step 2 is axial turning away from the first end 54, or clamping end, of the metal work piece. Step 3 is a profiling operation in the form of a feed which has both an axial and a radial component, generating a conical or frustoconical surface. Step 4 is an operation similar to step 2. Step 5 is an out-facing operation generation a flat surface located in a plane perpendicular to the rotational axis A3 of the metal work piece. Step 6 is an out-facing operation at the second end 55, or free end, of the metal work piece.

FIGS. 15a-f and FIGS. 17d-f further describe the third turning insert 1, as well as a turning tool 3, which includes the turning insert 1 and a tool body 2. The turning insert 1 includes a top surface 8, which is or includes a rake face 14, and an opposite bottom surface 9, functioning as a seating surface. A reference plane RP is located parallel to and between the top surface 8 and the bottom surface 9. A center axis A1 extends perpendicular to the reference plane RP and intersects the reference plane RP, the top surface 8 and the bottom surface 9. A screw hole having openings in the top surface 8 and the bottom surface 9 is concentric with the center axis A1.

The third turning insert 1 includes side surfaces 13, functioning as clearance surfaces, connecting the top surface 8 and the bottom surface 9. Two opposite nose portions 15, 15' are formed symmetrically relative to or around the center axis A1. The nose portions 15, 15' are identical. Each nose portion 15, 15' includes a first cutting edge 11, a second cutting edge 12 and a convex nose cutting edge 10 connecting the first 11 and second 12 cutting edges. Each nose portion 15, 15' further includes a third convex cutting edge 60, formed adjacent to the first cutting edge 11, and a fourth cutting edge 61 formed adjacent to the third cutting edge 60, further away from the nose cutting edge 10. Each nose portion 15, 15' further includes a fifth convex cutting edge 62 formed adjacent to the second cutting edge 12, and a sixth cutting edge 63 formed adjacent to the fifth cutting edge 62, further away from the nose cutting edge 10. In top view, as in FIG. 15d, the first, second, fourth and sixth cutting edges 11, 12, 61, 63 are linear or straight, or substantially linear or straight.

The nose cutting edges 10, 10' are located at a largest distance from the center axis A1, i.e. at a larger distance from the center axis A1 than all other parts of the turning insert. In a top view, seen in FIG. 15d, the first 11 and second 12 cutting edges on the same nose portion 15 forms a nose angle α of 75-85° relative to each other, in FIG. 15d the nose angle α is 80°. In a side view, such as in FIG. 15c, at least a portion of the fourth and sixth cutting edges 61, 63 on each nose portion 15, 15', 15" slopes towards the bottom surface 9, such that in a side view, the fourth and sixth cutting edges 61, 63 has the highest points thereof closer to the nose cutting edge 10 on the same nose portion 15. In other words, the distance from the fourth cutting edge 61 and the sixth cutting edge 63 to the reference plane RP varies in such a way that that this distance is decreasing at increasing distance from the nose cutting edge 10. Further, the first, second third and fifth cutting edges 11, 12, 60, 62 are sloping towards the bottom surface 9 in a corresponding manner, such that in relation to the bottom surface 9, the nose cutting edge 10 is further away than the first and second cutting edges 11, 12, which in turn are further away than the third and fifth cutting edges 60, 62, which in turn are further away than the fourth and sixth cutting edges 61, 63.

Bisectors 7, 7' extend equidistantly from each pair of first 11, 11' and second 12, 12' cutting edges. Each bisector 7, 7' intersects the center axis A1, and the bisectors 7, 7' extend in a common direction. The bottom surface 9 is identical to the top surface 8. In a top view, as in FIG. 15*d*, the fourth cutting edge 61 forms an angle β of 0-34° relative to the bisector 7, which in FIG. 15*d* is 10-20°.

The top surface 8 includes protrusions 30 having a first chip breaker wall 34 facing the fourth cutting edge 61. The distance from the fourth cutting edge 61 to the first chip breaker wall 34 is increasing away from the nose cutting edge 10. The protrusions 30 are intended to function as seating surfaces, and the top surface of each protrusion is flat and parallel to the reference plane RP. The protrusions 30 are the part of the turning insert 1 which are located at the greatest distance from the reference plane RP. The protrusion includes a second chip breaker wall facing the sixth cutting edge. The distance, from the fourth cutting edge 61 to the first chip breaker wall 34, is measured in a direction perpendicular to the fourth cutting edge 61, and in a plane parallel to the reference plane RP, to the first chip breaker wall 34. The protrusion 30, and thus the first chip breaker wall 34, does not necessarily have to extend along the whole length of the fourth cutting edge 61. Still, the distance from the fourth cutting edge 61 to the first chip breaker wall 34 is increasing at the portion of the fourth cutting edge 61 where perpendicular to this fourth cutting edge 61, the first chip breaker wall 34 extends.

A distance D1 measured in a plane perpendicular to the reference plane RP between the top surface of the protrusion 30 and the lowest point of the fourth cutting edge 61 is 0.28-0.35 mm. Bumps 80, or protrusions, are formed in the top surface 8. The bumps 80 are located at a distance, greater than 0.3 mm and less than 3.0 mm, from the fourth cutting edge 61. The bumps 80 are located between the fourth cutting edge 61 and the first chip breaker wall 34. The bumps 80 have a non-circular shape in top view, such that a major extension, which is 0.8-3.0 mm, of the bumps is in a direction substantially perpendicular to or perpendicular to the fourth cutting edge 61. The minor extension of the bumps perpendicular to the major extension is 0.5-2.0 mm. The bumps 80, or protrusions, are portions of the top surface 8 which extends away from the reference plane in relation to the surrounding area.

In a top view as in FIG. 15*d*, the bumps 80 can have an elliptic or oval or substantially elliptic or oval shape. The bumps 80 are separated from each other. The bumps 80 can be located at a constant distance from each other. The bumps 80 also can be located at a constant distance from the fourth cutting edge 61. In the first embodiment, there are 5 bumps adjacent to the fourth cutting edge. It is possible to have 2-10 bumps adjacent to the fourth cutting edge.

There is at least one further bump 80, for the third turning insert there are 2-3 bumps 80, located perpendicular to and having an major extension in a direction perpendicular to the third cutting edge 60, and at least one further bump 80, in the first embodiment 1-2 bumps 80, located perpendicular to and having an major extension in a direction perpendicular to the first cutting edge 11.

The third turning insert 1 is symmetrical, or mirror images, on opposite sides of the bisectors 7, 7'. Therefore, bumps 80 are formed in a corresponding manner at a distance from the second, fifth and sixth cutting edges 12, 62, 63.

By such a turning insert 1, chip breaking and/or chip control is further improved, especially at lower depth of cut, i.e. when the depths of cut is such that the first cutting edge 11 is active and that the fourth cutting edge 61 is inactive. At such low depth of cut, the chip is very thin, due to the low entering angle by the first cutting edge 11, and the bump or bumps 80, closest to the first cutting edge 11, function as chip breakers. The major extension of the bumps 80 gives the effect that the time, until the wear of the bumps 80 reduces the effect of the bumps 80 on the chips, is increased.

Reference is now made to FIGS. 18-22*a-e*, which shows a fourth, fifth, sixth, seventh and eighth type of turning insert, respectively, suitable for the method according to the invention. These inserts differ from the third insert only with regards to the bottom surface and the side surfaces.

Thus, the fourth, fifth, sixth, seventh and eighth turning inserts 1, shown in FIGS. 18-22*a-e* respectively, have the same or identical shape, form, dimension, value and inter-relations between features and elements as the third turning insert with regards to the top surface 8, reference plane RP, screw hole, first cutting edge 11, nose cutting edge 10, second cutting edge 12, third cutting edge 60, fourth cutting edge 61, fifth cutting edge 62, sixth cutting edge 63, nose angle α, bisector 7, angle β, rake face 14, protrusion 30, first chip breaker wall 34, second chip breaker wall, distance D1 and bumps 80.

The fourth, fifth, sixth and seventh turning inserts 1, shown in FIGS. 18-21*a-e*, are formed such that a first side surface 13 includes a first clearance surface 21 adjacent to the first cutting edge 11, a third clearance surface 23, and a second clearance surface 22 located between the first clearance surface 21 and the third clearance surface 23.

The angle which the second clearance surface 22 forms in relation to the bottom surface 9, measured in a plane perpendicular to the first cutting edge 11, is greater than the angle which the third clearance surface 23 forms in relation to the bottom surface measured in a plane perpendicular to the first cutting edge 11.

The angle which the second clearance surface 22 forms in relation to the bottom surface 9, measured in a plane perpendicular to the first cutting edge 11, is greater than the angle which the first clearance surface 21 forms in relation to the bottom surface measured in a plane perpendicular to the first cutting edge 11.

The side surfaces 13, 13' of each nose portion 15, 15' are configured symmetrically in relation to a plane perpendicular to the reference plane RP and comprising the bisector 7. The clearance surface adjacent to the second cutting edge 12 is formed or arranged in a corresponding manner. The advantages from the clearance surface arrangements are that out-facing can be performed at small metal work piece diameters, and that larger depth of cut is possible in out-facing.

Reference is now made to FIGS. 18*a-e*, which shows the fourth turning insert 1. The bottom surface 9 includes rotation prevention means 40, in order to reduce movement of the turning insert 1 relative to the insert seat 4 during machining. The rotation prevention means 40 are in the form of two grooves 40, 40' having a common major extension, which major extension is corresponding to the extension of the bisectors 7, 7'.

Reference is now made to FIGS. 19*a-e*, which shows the fifth turning insert 1. The bottom surface 9 includes rotation prevention means 40, in order to reduce movement of the turning insert 1 relative to the insert seat 4 during machining. The rotation prevention means 40 are in the form of two grooves 40, 40' having a common major extension, which major extension is corresponding to the extension of the bisectors 7, 7'. Each groove 40, 40' includes two surfaces which are form an obtuse angle, in the range of 100-160°, in relation to each other.

Reference is now made to FIGS. 20*a-e*, which show a sixth turning insert 1. The bottom surface 9 includes rotation prevention means 40, in order to reduce movement of the turning insert 1 relative to the insert seat 4 during machining. The rotation prevention means 40 are in the form of two ridges 40, 40' having a common major extension, which major extension is corresponding to the extension of the bisectors 7, 7'.

Reference is now made to FIGS. 21a-e, which show a seventh turning insert. The bottom surface 9 includes a flat surface 9, which is parallel to the reference plane RP.

Reference is now made to FIGS. 22a-e, which show an eighth turning insert 1. The bottom surface 9 includes a flat surface 9, which is parallel to the reference plane RP. The flat surface 9 is ring-shaped around the center axis of the turning insert. A first side surface 13 includes a first clearance surface 21 adjacent to the first cutting edge 11 and a third clearance surface 23. The third clearance surface 23 borders to the bottom surface 9.

The angle, which the first clearance surface 21 forms in relation to the bottom surface 9, measured in a plane perpendicular to the first cutting edge 11, is greater than the angle which the third clearance surface 23 forms in relation to the bottom surface measured in a plane perpendicular to the first cutting edge 11. The clearance surface adjacent to the second cutting edge 12 is formed or arranged in a corresponding manner. The advantages from the clearance surface arrangements are that out-facing can be performed at small metal work piece diameters, and that larger depth of cut is possible in out-facing.

The protrusion 30 includes grooves formed in the top surface of the protrusion 30. The grooves have a major extension perpendicular to the bisector 7.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A method to form a surface on a metal work piece comprising:
   a first machining step of providing a turning insert including a first cutting edge, a second cutting edge and a convex nose cutting edge connecting the first and second cutting edges, and selecting a nose angle formed between the first and second cutting edges to be less than or equal to 85°;
   providing a turning tool including the turning insert and a tool body, the tool body having a front end and a rear end, a main extension along a longitudinal axis extending from the front end to the rear end, and an insert seat formed in the front end in which the turning insert is mountable;
   arranging the orientation of the second cutting edge such that it forms a back clearance angle of more than 90° in a feed direction;
   positioning all parts of the turning insert ahead of the nose cutting edge in the feed direction;
   rotating the metal work piece around a rotational axis in a first direction;
   moving the turning insert in a direction parallel to or at an angle less than 45° relative to the rotational axis such that the first cutting edge is active and ahead of the nose cutting edge in the feed direction and such that the surface at least partly is formed by the nose cutting edge; and
   setting the longitudinal axis of the tool body at an angle greater than zero, but less than or equal to 90° relative to the rotational axis of the metal work piece.

2. The method according to claim 1, wherein the first machining step further comprises the steps of clamping the metal work piece at a first end, setting the nose cutting edge a shorter distance to the first end than all other parts of the turning insert and moving the turning insert in a direction away from the first end.

3. The method according to claim 1, wherein the first machining step further comprises the step of arranging the first cutting edge such that the first cutting edge cuts metal chips from the metal work piece at an entering angle of 10-45°.

4. The method according to claim 1, wherein the turning insert includes a third convex cutting edge adjacent to the first cutting edge and a fourth cutting edge adjacent to the third cutting edge, the method further comprising the step of arranging the fourth cutting edge such that the fourth cutting edge cuts metal chips from the metal work piece at an entering angle of 10-45°.

5. The method according to claim 4, wherein the turning insert includes a top surface, an opposite bottom surface, and a reference plane located parallel to and between the top surface and the bottom surface, the method further comprising the step of arranging the fourth cutting edge such that the distance the fourth cutting edge to the reference plane decreases as a distance from the nose cutting edge increases.

6. The method according to claim 1, wherein the first machining step further comprises the step of entering the turning insert into the metal work piece at an angle relative to the rotation axis which is less than 90°, the angle being greater than the angle formed between the feed direction of the turning insert and the rotation axis.

7. The method according to claim 1, wherein the first machining step further comprises the step of entering the turning insert into the metal work piece such that the nose cutting edge moves along an arc of a circle.

8. The method according to claim 1, wherein the surface is an external cylindrical surface and the moving of the turning insert is in a direction parallel to the rotational axis.

9. The method according to claim 1, further comprising the step of setting the back clearance angle constant in relation to the feed direction during the formation of the surface.

10. The method according to claim 1, further comprising the step of positioning all parts of the tool body ahead of the nose cutting edge in the feed direction.

11. The method according to claim 1, wherein the nose angle formed between the first and second cutting edges is 70°-85°.

12. The method according to claim 1, wherein the nose angle formed between the first and second cutting edges is 25°-50°.

13. A method to form a surface on a metal work piece comprising:
   a first machining step of providing a turning insert including a first cutting edge, a second cutting edge and a convex nose cutting edge connecting the first and second cutting edges, and selecting a nose angle formed between the first and second cutting edges to be less than or equal to 85°;
   arranging the turning insert such that the turning insert includes a top surface, an opposite bottom surface, wherein a reference plane is located parallel to and between the top surface and the bottom surface;

arranging the first cutting edge such that the distance from the first cutting edge to the reference plane decreases as a distance from the nose cutting edge increases;

arranging the orientation of the second cutting edge such that it forms a back clearance angle of more than 90° in a feed direction;

positioning all parts of the turning insert ahead of the nose cutting edge in the feed direction;

rotating the metal work piece around a rotational axis in a first direction; and moving the turning insert in a direction parallel to or at an angle less than 45° relative to the rotational axis such that the first cutting edge is active and ahead of the nose cutting edge in the feed direction and such that the surface at least partly is formed by the nose cutting edge.

14. The method according to claim 13, wherein the surface of the workpiece is an external surface.

15. The method according to claim 13, wherein the surface of the workpiece is an external rotational symmetrical surface.

16. The method according to claim 13, wherein the surface of the workpiece is an external cylindrical surface.

17. The method according to claim 13, wherein the surface of the workpiece is an external conical surface.

18. The method according to claim 13, wherein the surface of the workpiece is an external frustoconical surface.

19. The method according to claim 13, wherein the surface of the workpiece is an external tapered surface.

20. A method to form a surface on a metal work piece comprising:

a first machining step of providing a turning insert including a first cutting edge, a second cutting edge and a convex nose cutting edge connecting the first and second cutting edges, and selecting a nose angle formed between the first and second cutting edges to be less than or equal to 85°;

providing a turning tool including the turning insert and a tool body, the tool body having a front end and a rear end, a main extension along a longitudinal axis extending from the front end to the rear end, and an insert seat formed in the front end in which the turning insert is mountable;

arranging the orientation of the second cutting edge such that it forms a back clearance angle of more than 90° in a feed direction;

rotating the metal work piece around a rotational axis in a first direction;

moving the turning insert in a direction parallel to or at an angle less than 45° relative to the rotational axis such that the first cutting edge is active and ahead of the nose cutting edge in the feed direction and such that the surface at least partly is formed by the nose cutting edge; and setting the longitudinal axis of the tool body at an angle greater than zero but less than or equal to 90° relative to the rotational axis of the metal work piece.

21. The method according to claim 20, wherein the first machining step further comprises the steps of clamping the metal work piece at a first end, setting a trailing point of the nose cutting edge a shorter distance to the first end than the second cutting edge of the turning insert and moving the turning insert in a direction away from the first end.

22. The method according to claim 20, wherein the first machining step further comprises the step of arranging the first cutting edge such that the first cutting edge cuts metal chips from the metal work piece at an entering angle of 10-45°.

23. The method according to claim 20, wherein the turning insert includes a third convex cutting edge adjacent to the first cutting edge and a fourth cutting edge adjacent to the third cutting edge, the method further comprising the step of arranging the fourth cutting edge such that the fourth cutting edge cuts metal chips from the metal work piece at an entering angle of 10-45°.

24. The method according to claim 23, wherein the turning insert includes a top surface, an opposite bottom surface, and a reference plane located parallel to and between the top surface and the bottom surface, the method further comprising the step of arranging the fourth cutting edge such that the distance the fourth cutting edge to the reference plane decreases as a distance from the nose cutting edge increases.

25. The method according to claim 20, wherein the first machining step further comprises the step of entering the turning insert into the metal work piece at an angle relative to the rotation axis which is less than 90°, the angle being greater than the angle formed between the feed direction of the turning insert and the rotation axis.

26. The method according to claim 20, wherein the first machining step further comprises the step of entering the turning insert into the metal work piece such that the nose cutting edge moves along an arc of a circle.

27. The method according to claim 20, wherein the surface is an external cylindrical surface and the moving of the turning insert is in a direction parallel to the rotational axis.

28. The method according to claim 20, further comprising the step of setting the back clearance angle constant in relation to the feed direction during the formation of the surface.

29. The method according to claim 20, further comprising the step of positioning all parts of the tool body ahead of the nose cutting edge in the feed direction.

30. The method according to claim 20, wherein the nose angle formed between the first and second cutting edges is 70°-85°.

31. The method according to claim 20, wherein the nose angle formed between the first and second cutting edges is 25°-50°.

32. A method to form a surface on a metal work piece comprising:

a first machining step of providing a turning insert including a first cutting edge, a second cutting edge and a convex nose cutting edge connecting the first and second cutting edges, and selecting a nose angle formed between the first and second cutting edges to be less than or equal to 85°;

arranging the turning insert such that the turning insert includes a top surface, an opposite bottom surface, wherein a reference plane is located parallel to and between the top surface and the bottom surface;

arranging the first cutting edge such that the distance from the first cutting edge to the reference plane decreases as a distance from the nose cutting edge increases;

arranging the orientation of the second cutting edge such that it forms a back clearance angle of more than 90° in a feed direction;

rotating the metal work piece around a rotational axis in a first direction; and moving the turning insert in a direction parallel to or at an angle less than 45° relative to the rotational axis such that the first cutting edge is active and ahead of the nose cutting edge in the feed direction and such that the surface at least partly is formed by the nose cutting edge.

33. The method according to claim 32, wherein the surface of the workpiece is an external surface.

34. The method according to claim 32, wherein the surface of the workpiece is an external rotational symmetrical surface.

35. The method according to claim 32, wherein the surface of the workpiece is an external cylindrical surface.

36. The method according to claim 32, wherein the surface of the workpiece is an external conical surface.

37. The method according to claim 32, wherein the surface of the workpiece is an external frustoconical surface.

38. The method according to claim 32, wherein the surface of the workpiece is an external tapered surface.

\* \* \* \* \*